US012695406B2

(12) United States Patent (10) Patent No.: US 12,695,406 B2
Kutsuki et al. (45) Date of Patent: Jul. 28, 2026

(54) POWER CONVERTER, MOTOR DRIVE DEVICE, AND REFRIGERATION CYCLE APPLICATION APPARATUS

(71) Applicant: Mitsubishi Electric Corporation, Tokyo (JP)

(72) Inventors: Tomohiro Kutsuki, Tokyo (JP); Koyo Matsuzaki, Tokyo (JP); Koichi Arisawa, Tokyo (JP); Takaaki Takahara, Tokyo (JP); Haruka Matsuo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 226 days.

(21) Appl. No.: 18/687,516

(22) PCT Filed: Nov. 9, 2021

(86) PCT No.: PCT/JP2021/041185
§ 371 (c)(1),
(2) Date: Feb. 28, 2024

(87) PCT Pub. No.: WO2023/084600
PCT Pub. Date: May 19, 2023

(65) Prior Publication Data
US 2024/0372498 A1 Nov. 7, 2024

(51) Int. Cl.
H02P 27/04 (2016.01)
H02P 21/05 (2006.01)
(Continued)

(52) U.S. Cl.
CPC ............ H02P 27/085 (2013.01); H02P 21/05 (2013.01)

(58) Field of Classification Search
CPC ............................... H02P 27/085; H02P 21/05
(Continued)

(56) References Cited

U.S. PATENT DOCUMENTS

2006/0179859 A1* 8/2006 Nakata ...................... H02P 6/06
62/228.1
2014/0247003 A1* 9/2014 Yamasaki ............. B60L 15/025
318/802
(Continued)

FOREIGN PATENT DOCUMENTS

JP H07-71805 A 3/1995
JP 2006-271109 A 10/2006
(Continued)

OTHER PUBLICATIONS

International Search Report of the International Searching Authority mailed Dec. 28, 2021 for the corresponding International Application No. PCT/JP2021/041185 (and English translation).

*Primary Examiner* — Erick D Glass
(74) *Attorney, Agent, or Firm* — Posz Law Group, PLC

(57) ABSTRACT

A power converter includes a capacitor connected to an output end of a rectifier unit that rectifies first AC power, an inverter that is connected across the capacitor and generates second AC power for output to a motor, and a control unit that controls the operation of the inverter such that pulsation according to the power state of the capacitor is superimposed on a drive pattern of the motor. The control unit performs load pulsation compensation control to reduce the vibration of the motor and power pulsation compensation control to reduce the charging and discharging current of the capacitor while preferentially performing constant current load control to control the rotational speed of the motor, and generates a torque current command for the load pulsation compensation control such that a torque current command allocatable to the power pulsation compensation control remains.

18 Claims, 14 Drawing Sheets

(51) Int. Cl.
    *H02P 27/06*         (2006.01)
    *H02P 27/08*         (2006.01)
(58) Field of Classification Search
    USPC ........................................................ 318/801
    See application file for complete search history.

(56)                References Cited

U.S. PATENT DOCUMENTS

2015/0180384 A1*  6/2015  An ...................... H02M 1/4225
                                   318/400.3
2019/0052210 A1*  2/2019  Li ........................... F25B 31/02

FOREIGN PATENT DOCUMENTS

JP        2016-178814 A    10/2016
JP        2018-137851 A     8/2018

* cited by examiner

Figure 9:
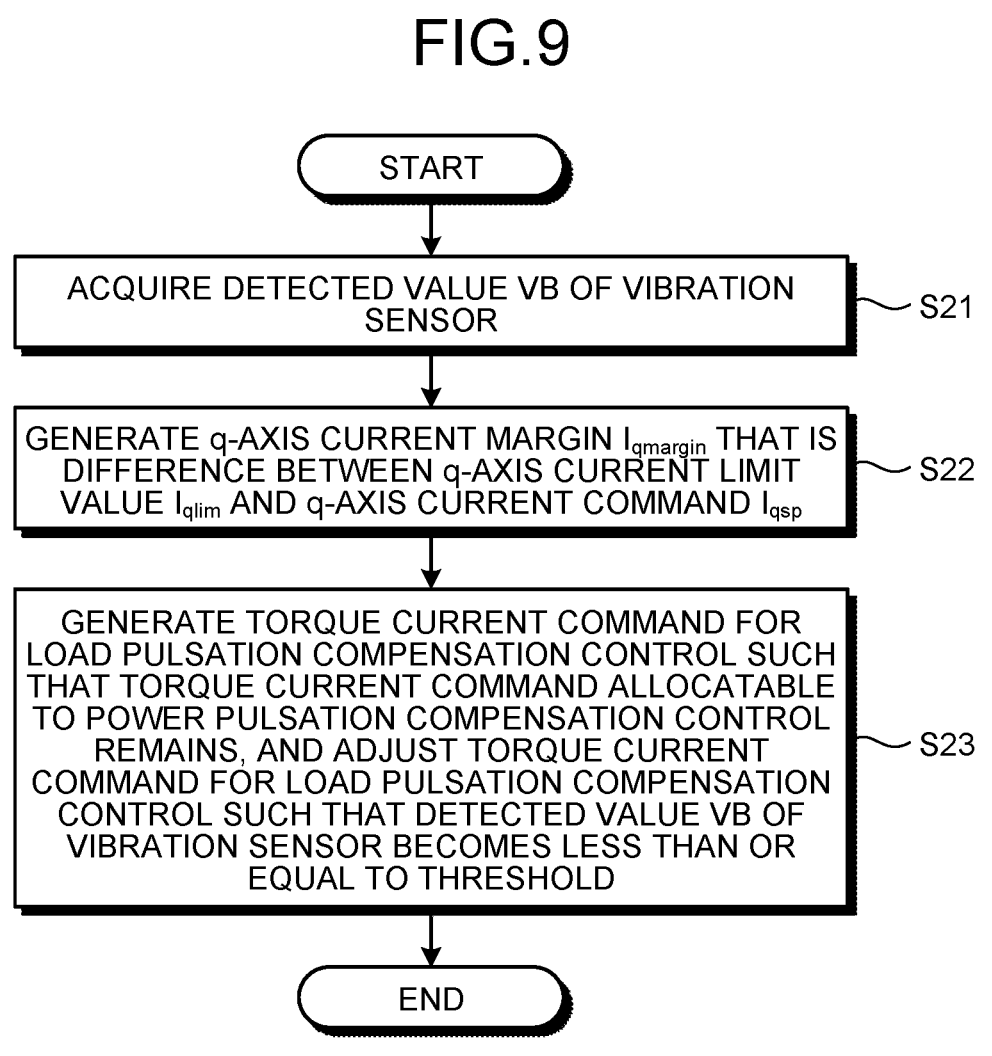

START

ACQUIRE DETECTED VALUE VB OF VIBRATION SENSOR — S21

GENERATE q-AXIS CURRENT MARGIN $I_{qmargin}$ THAT IS DIFFERENCE BETWEEN q-AXIS CURRENT LIMIT VALUE $I_{qlim}$ AND q-AXIS CURRENT COMMAND $I_{qsp}$ — S22

GENERATE TORQUE CURRENT COMMAND FOR LOAD PULSATION COMPENSATION CONTROL SUCH THAT TORQUE CURRENT COMMAND ALLOCATABLE TO POWER PULSATION COMPENSATION CONTROL REMAINS, AND ADJUST TORQUE CURRENT COMMAND FOR LOAD PULSATION COMPENSATION CONTROL SUCH THAT DETECTED VALUE VB OF VIBRATION SENSOR BECOMES LESS THAN OR EQUAL TO THRESHOLD — S23

END

FIG.12

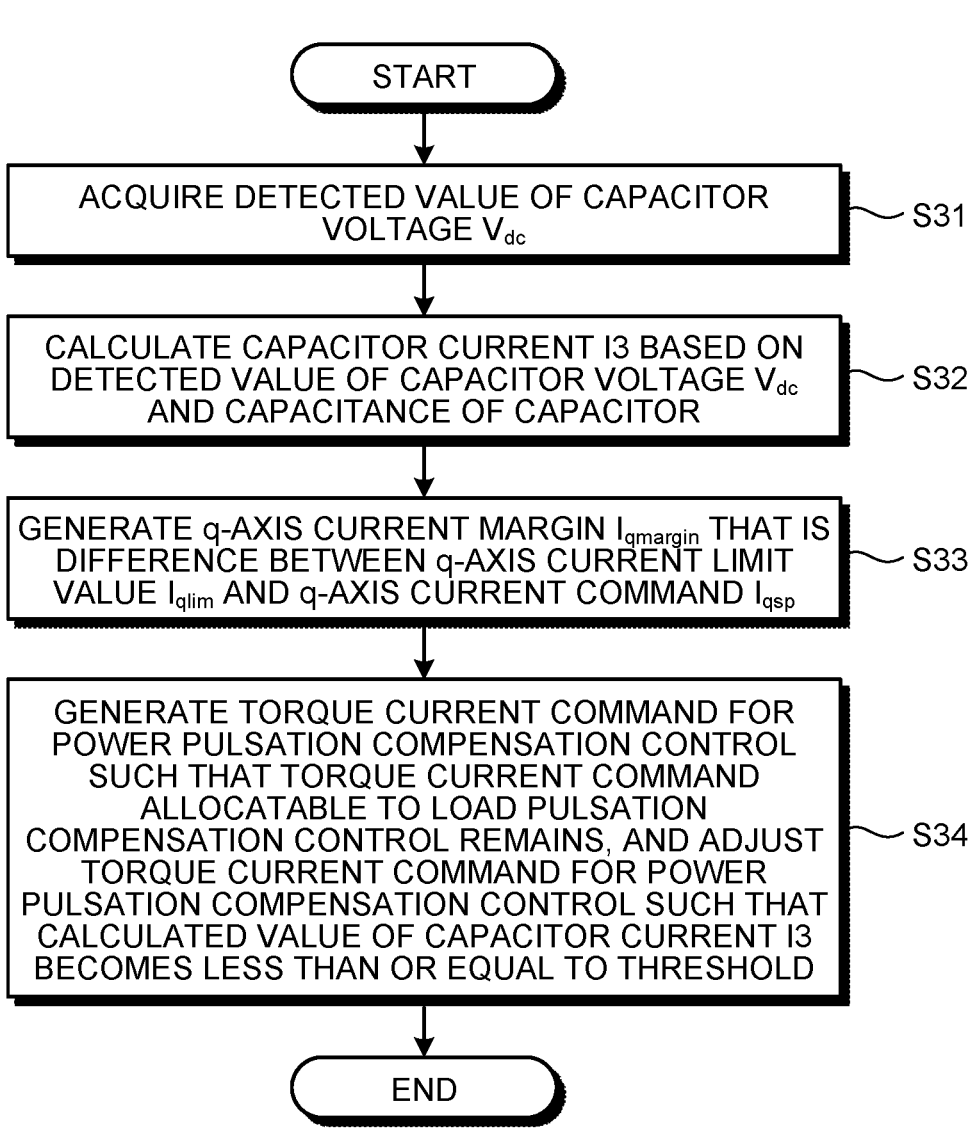

START

ACQUIRE DETECTED VALUE OF CAPACITOR VOLTAGE $V_{dc}$ — S31

CALCULATE CAPACITOR CURRENT I3 BASED ON DETECTED VALUE OF CAPACITOR VOLTAGE $V_{dc}$ AND CAPACITANCE OF CAPACITOR — S32

GENERATE q-AXIS CURRENT MARGIN $I_{qmargin}$ THAT IS DIFFERENCE BETWEEN q-AXIS CURRENT LIMIT VALUE $I_{qlim}$ AND q-AXIS CURRENT COMMAND $I_{qsp}$ — S33

GENERATE TORQUE CURRENT COMMAND FOR POWER PULSATION COMPENSATION CONTROL SUCH THAT TORQUE CURRENT COMMAND ALLOCATABLE TO LOAD PULSATION COMPENSATION CONTROL REMAINS, AND ADJUST TORQUE CURRENT COMMAND FOR POWER PULSATION COMPENSATION CONTROL SUCH THAT CALCULATED VALUE OF CAPACITOR CURRENT I3 BECOMES LESS THAN OR EQUAL TO THRESHOLD — S34

END

FIG.15

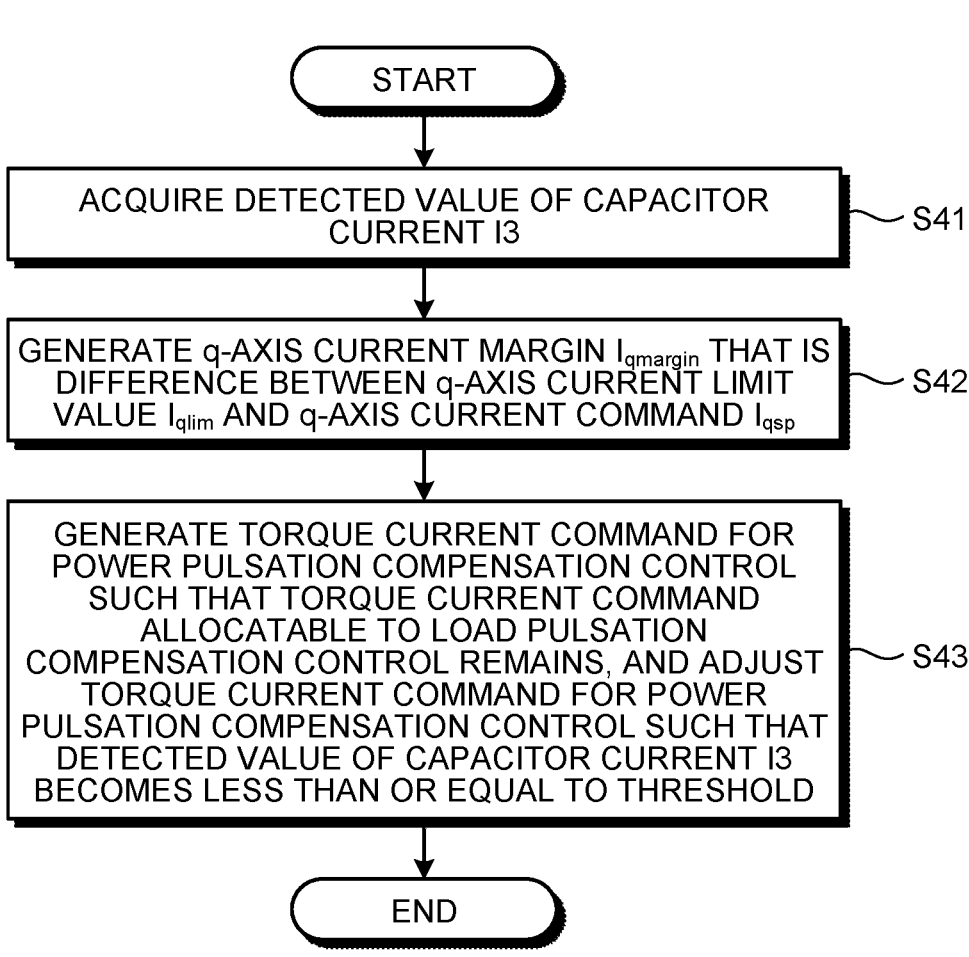

START

↓

ACQUIRE DETECTED VALUE OF CAPACITOR CURRENT I3 ~S41

↓

GENERATE q-AXIS CURRENT MARGIN $I_{qmargin}$ THAT IS DIFFERENCE BETWEEN q-AXIS CURRENT LIMIT VALUE $I_{qlim}$ AND q-AXIS CURRENT COMMAND $I_{qsp}$ ~S42

↓

GENERATE TORQUE CURRENT COMMAND FOR POWER PULSATION COMPENSATION CONTROL SUCH THAT TORQUE CURRENT COMMAND ALLOCATABLE TO LOAD PULSATION COMPENSATION CONTROL REMAINS, AND ADJUST TORQUE CURRENT COMMAND FOR POWER PULSATION COMPENSATION CONTROL SUCH THAT DETECTED VALUE OF CAPACITOR CURRENT I3 BECOMES LESS THAN OR EQUAL TO THRESHOLD ~S43

↓

END

POWER CONVERTER, MOTOR DRIVE DEVICE, AND REFRIGERATION CYCLE APPLICATION APPARATUS

CROSS REFERENCE TO RELATED APPLICATION

This application is a U.S. national stage application of PCT/JP2021/041185 filed on Nov. 9, 2021, the contents of which are incorporated herein by reference.

FIELD

The present disclosure relates to a power converter that converts AC power into desired power, a motor drive device, and a refrigeration cycle application apparatus.

BACKGROUND

There have been power converters that convert AC power supplied from an AC source into desired AC power to supply the AC power to a load such as an air conditioner. For example, Patent Literature 1 below discloses a technique in which a power converter that is a controller of an air conditioner rectifies AC power supplied from an AC source by a diode stack that is a rectifier unit, and further converts the power smoothed by a smoothing capacitor into desired AC power by an inverter consisting of a plurality of switching elements, to output the AC power to a compressor motor that is a load.

CITATION LIST

Patent Literature

Patent Literature 1: Japanese Patent Application Laid-open No. H07-071805

SUMMARY OF INVENTION

Problem to be Solved by the Invention

However, the above conventional technique has a problem in that aging deterioration of the smoothing capacitor is accelerated because a large pulsating current flows through the capacitor. To this problem, a method of reducing ripple changes in capacitor voltage by increasing the capacitance of the capacitor, or a method of using a capacitor having a high tolerance to deterioration caused by ripple can be considered. However, such a method has a problem in that the cost of the capacitor component increases, and the size of the device increases.

The present disclosure has been made in view of the above, and an object thereof is to provide a power converter that can reduce the deterioration of a capacitor while reducing or preventing the device from becoming larger.

Means to Solve the Problem

To solve the above-described problem and achieve the object, a power converter according to the present disclosure includes a rectifier unit that rectifies first AC power supplied from a commercial power source, a capacitor connected to an output end of the rectifier unit, and an inverter that is connected across the capacitor and generates second AC power for output to a motor. The power converter includes a control unit that controls the operation of the inverter such that pulsation according to the power state of the capacitor is superimposed on a drive pattern of the motor, to reduce a charging and discharging current of the capacitor. The control unit performs load pulsation compensation control to reduce the vibration of the motor and power pulsation compensation control to reduce the charging and discharging current of the capacitor while preferentially performing constant current load control to control the rotational speed of the motor, and generates a torque current command for the load pulsation compensation control such that a torque current command allocatable to the power pulsation compensation control remains.

Effects of the Invention

The power converter according to the present disclosure has the effect of being able to reduce the deterioration of the capacitor while reducing or preventing the device from becoming larger.

BRIEF DESCRIPTION OF DRAWINGS

FIG. 2 is a block diagram illustrating a configuration example of a control unit included in the power converter according to the first embodiment.

FIG. 9 is a flowchart for explaining the operation of the main part of the power converter according to the second embodiment.

FIG. 12 is a flowchart for explaining the operation of the main part of the power converter according to the third embodiment.

FIG. 15 is a flowchart for explaining the operation of the main part of the power converter according to the fourth embodiment.

DESCRIPTION OF EMBODIMENTS

Hereinafter, a power converter, a motor drive apparatus, and a refrigeration cycle application apparatus according to embodiments of the present disclosure will be described in detail with reference to the accompanying drawings.

First Embodiment

Figure 1:
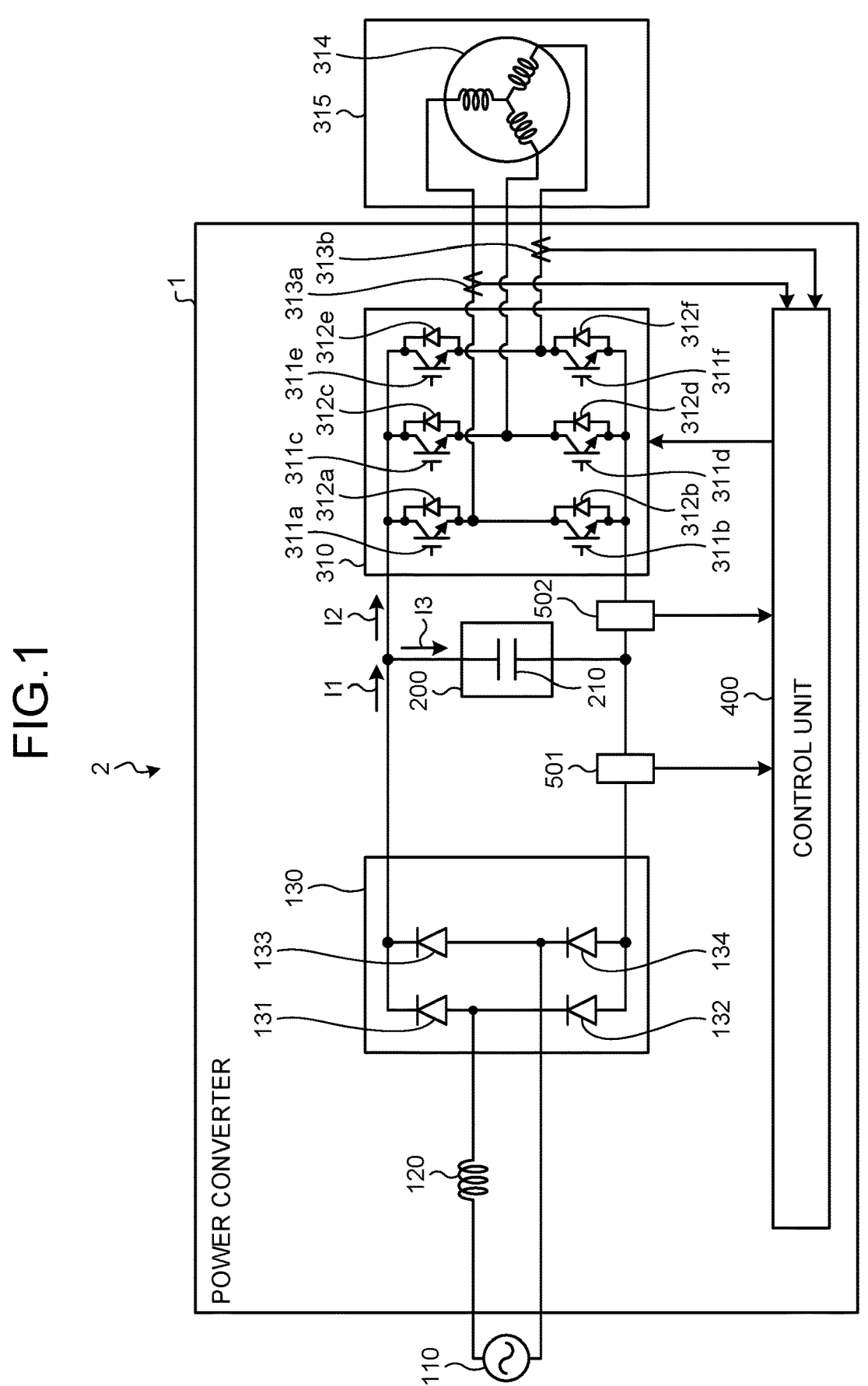
FIG. 1 is a diagram illustrating a configuration example of a power converter according to a first embodiment.

FIG. 1 is a diagram illustrating a configuration example of a power converter 1 according to a first embodiment. The power converter 1 is connected to a commercial power source 110 and a compressor 315. The power converter 1 converts first AC power of source voltage Vs supplied from the commercial power source 110 into second AC power having desired amplitude and phases, and supplies the second AC power to the compressor 315. The commercial power source 110 is an example of an AC source. The compressor 315 is an example of an apparatus referred to in the first embodiment. A motor 314 is installed in the compressor 315. The power converter 1 and the motor 314 included in the compressor 315 constitute a motor drive apparatus 2.

The power converter 1 includes a reactor 120, a rectifier unit 130, current detection units 501 and 502, a smoothing unit 200, an inverter 310, current detection units 313a and 313b, and a control unit 400.

The reactor 120 is connected between the commercial power source 110 and the rectifier unit 130. The rectifier unit 130 includes a bridge circuit composed of rectifier elements 131 to 134, and rectifies the first AC power of the source voltage supplied from the commercial power source 110 for output. The rectifier unit 130 performs full-wave rectification.

The smoothing unit 200 is connected to an output end of the rectifier unit 130. The smoothing unit 200 includes a capacitor 210 as a smoothing element, and smooths the power rectified by the rectifier unit 130. The capacitor 210 is, for example, an electrolytic capacitor, a film capacitor, or the like. The capacitor 210 is connected to the output end of the rectifier unit 130, and has a capacity to smooth the power rectified by the rectifier unit 130. The voltage generated in the capacitor 210 by the smoothing does not have a full-wave rectified waveform shape of the commercial power source 110, but has a waveform shape in which voltage ripple according to the frequency of the commercial power source 110 is superimposed on the DC component, and does not pulsate greatly. When the commercial power source 110 is a single-phase power source, the frequency of the voltage ripple has the main component that is twice the component of the frequency of the source voltage Vs. When the commercial power source 110 is a three-phase power source, the frequency of the voltage ripple has the main component that is six times the component of the frequency of the source voltage Vs. When the power input from the commercial power source 110 and the power output from the inverter 310 do not change, the amplitude of the voltage ripple is determined by the capacitance of the capacitor 210. For example, the voltage pulsates in such a range that the maximum value of the voltage ripple generated in the capacitor 210 is less than twice the minimum value.

The current detection unit 501 detects a rectified current I1 flowing from the rectifier unit 130, and outputs a detected value of the detected rectified current I1 to the control unit 400. The current detection unit 502 detects an inverter input current I2 that is a current flowing into the inverter 310, and outputs a detected value of the detected inverter input current I2 to the control unit 400. The current detection units 501 and 502 can be used as detection units that detect the power state of the capacitor 210. The inverter 310 is connected across the smoothing unit 200, that is, the capacitor 210. The inverter 310 includes switching elements 311a to 311f and freewheeling diodes 312a to 312f. In the inverter 310, the switching elements 311a to 311f are on-off controlled by the control of the control unit 400. By this control, the power output from the rectifier unit 130 and the smoothing unit 200 is converted into the second AC power having the desired amplitude and phases. That is, the inverter 310 generates the second AC power by turning on and off the switching elements 311a to 311f, and outputs the second AC power to the motor 314.

Each of the current detection units 313a and 313b detects the current value of one phase of three-phase current output from the inverter 310, and outputs the detected current value to the control unit 400. The control unit 400 can calculate the current value of the remaining one phase output from the inverter 310 by acquiring the current values of the two phases of the current values of the three phases output from the inverter 310.

The motor 314 installed in the compressor 315 rotates according to the amplitude and phases of the AC power supplied from the inverter 310, performing a compression operation. When the compressor 315 is a hermetic compressor used in an air conditioner or the like, the load torque of the compressor 315 can often be regarded as a constant torque load.

FIG. 1 illustrates a case where motor windings in the motor 314 are Y-connected, but the present invention is not limited to this example. The motor windings in the motor 314 may be Δ-connected, or may be designed to be switchable between Y connection and Δ connection. In the power converter 1, the arrangement of the components illustrated in FIG. 1 is an example. The arrangement of the components is not limited to the example illustrated in FIG. 1. For example, the reactor 120 may be disposed downstream of the rectifier unit 130. The power converter 1 may include a booster unit, or the rectifier unit 130 may have the function of a booster unit. In the following description, each of the current detection units 313a, 313b, 501, and 502 is sometimes simply referred to as a "detection unit". Current values detected by the current detection units 313a, 313b, 501, and 502 are sometimes simply referred to as "detected values".

The control unit 400 acquires the detected value of the rectified current I1 detected by the current detection unit 501 and the detected value of the inverter input current I2 detected by the current detection unit 502. The control unit 400 acquires the detected values of motor currents detected by the current detection units 313a and 313b. The control unit 400 uses the detected values detected by the detection units to control the operation of the inverter 310, specifically, to perform on-off control on the switching elements 311a to 311f of the inverter 310. The control unit 400 controls the operation of the inverter 310 such that the second AC power including pulsation corresponding to the pulsation of the power flowing from the rectifier unit 130 into the capacitor 210 of the smoothing unit 200 is output from the inverter 310 to the compressor 315. The pulsation corresponding to the pulsation of the power flowing into the capacitor 210 of the smoothing unit 200 is, for example, pulsation that varies depending on the frequency or the like of the pulsation of the power flowing into the capacitor 210 of the smoothing unit 200. Thus, the control unit 400 reduces a capacitor current I3 that is a charging and discharging current of the capacitor 210. The control unit 400 performs control such that any of the speed, the voltage, and the current of the motor 314 reaches a desired state. Note that the control unit 400 does not need to use all the detected values acquired from the detection units, and can perform control using some of the detected values.

When the motor 314 is used to drive the compressor 315, and the compressor 315 is a hermetic compressor, it is often difficult to attach a position sensor for detecting the rotor position to the motor 314 because of the structure and the cost. Therefore, the control unit 400 performs position sensorless control on the motor 314. There are two types of methods for position sensorless control on the motor 314, constant primary flux control and sensorless vector control. In the first embodiment, as an example, a description is given based on sensorless vector control. A control method described below can be applied to constant primary flux control with minor changes.

Next, a characteristic operation of the control unit 400 in the first embodiment will be described. First, the rectified current I1 flowing from the rectifier unit 130 is affected by the power phase of the commercial power source 110, the characteristics of elements installed before and after the rectifier unit 130, etc. As a result, the rectified current I1 has characteristics including the power frequency and harmonic components of the power frequency (frequency components that are the power frequency multiplied by integers equal to or larger than two). In the capacitor 210, when the capacitor current I3 is large, aging deterioration of the capacitor 210 is accelerated. In particular, when an electrolytic capacitor is used as the capacitor 210, the degree of acceleration of aging deterioration increases. Therefore, the control unit 400 controls the inverter 310 such that the inverter input current I2 becomes equal to the rectified current I1, to perform control to bring the capacitor current I3 close to zero. This can reduce the deterioration of the capacitor 210. However, ripple components caused by pulse-width modulation (PWM) are superimposed on the inverter input current I2. Therefore, the control unit 400 needs to control the inverter 310 with the ripple components taken into account.

Then, to reduce the deterioration of the capacitor 210, the control unit 400 monitors the power state of the smoothing unit 200, that is, the capacitor 210, and applies proper pulsation to the motor 314 to reduce the capacitor current I3. Here, the power state of the capacitor 210 refers to the rectified current I1, the inverter input current I2, the capacitor current I3, a capacitor voltage $V_{dc}$ that is the voltage of the capacitor 210, or the like. In the control unit 400, at least one of these power states of the capacitor 210 is information necessary for the deterioration reduction control.

In the power converter 1, the current detection unit 501 detects the current value of the rectified current I1 and outputs the detected value to the control unit 400. The current detection unit 502 detects the current value of the inverter input current I2 and outputs the detected value to the control unit 400. The control unit 400 controls the inverter 310 such that a value obtained by removing PWM ripple from the inverter input current I2 matches the rectified current I1, to apply pulsation to the power output to the motor 314. That is, the control unit 400 controls the operation of the inverter 310 such that pulsation according to the power state of the capacitor 210 is superimposed on a drive pattern of the motor 314. This reduces the capacitor current I3. This control is referred to as "power pulsation compensation control".

As described above, since the rectified current I1 includes the harmonic components of the power frequency, the inverter input current I2 and the q-axis current of the motor 314 also include the harmonic components of the power frequency. Therefore, the power converter 1 needs to properly pulsate the inverter input current I2 and the q-axis current of the motor 314.

Furthermore, it is known that even when, for example, the compressor 315 is used in an air conditioner, and the load on the compressor 315 is substantially constant, that is, the effective value of the inverter input current I2 is constant, some types of load on the compressor 315 include a mechanism that causes periodic rotational variation. Therefore, when a compressor load having this mechanism is driven, the load torque has periodic variation. Consequently, when the compressor 315 is driven with constant output current from the inverter 310, that is, constant torque output, speed variation due to torque difference occurs. There is a characteristic that the speed variation occurs remarkably in a low-speed range, and the speed variation decreases as the operating point moves to a high-speed range. The amount of speed variation flows to the outside and thus is observed on the outside as vibration. It is required to add a vibration-control component, for example. Therefore, a measure is often taken to pass pulsating torque, that is, pulsating current components through the compressor 315 in addition to constant current output from the inverter 310, that is, constant torque output component current, to apply torque according to load torque variation from the inverter 310 to the compressor 315. This can bring the torque difference close to zero to reduce the speed variation of the motor 314 of the compressor 315 to reduce vibration. As a result, the torque difference between the output torque of the inverter 310 and the load torque can be brought close to zero. Consequently, the speed variation of the motor 314 included in the compressor 315 can be reduced, and the vibration of the compressor 315 can be reduced. This control is referred to as "load pulsation compensation control".

As described above, in the first embodiment, the control unit 400 performs the constant current load control to control the rotational speed of the motor 314, the power pulsation compensation control to compensate for the power pulsation, and the load pulsation compensation control to compensate for the load pulsation. On the other hand, improper allocation by each control can cause a condition in which the rotational speed of the motor 314 cannot follow a speed command, the load pulsation compensation control results in overcompensation, or the power pulsation compensation cannot be satisfactorily controlled, for example. Therefore, in the first embodiment, the power converter 1 is operated such that the operation of each control becomes proper. The following describes a specific control method.

First, it is an essential matter in the power converter 1 that the motor 314 driven follow a speed command. Therefore, the control unit 400 performs control that prioritizes the constant current load control. The control unit 400 sets the limit value of a q-axis current command that can be used in each of the constant current load control, the power pulsation compensation control, and the load pulsation compensation control. Specifically, the control unit 400 sets limit values for the power pulsation compensation control and the load pulsation compensation control within a range obtained by subtracting the value of a q-axis current command to be used in the constant current load control from the total limit value of q-axis current commands, and generates q-axis current commands for the power pulsation compensation control and the load pulsation compensation control. That is, the control unit 400 performs the load pulsation compensation control to reduce the vibration of the motor 314 and the power pulsation compensation control to reduce the capacitor current I3 of the capacitor 210 while preferentially performing the constant current load control to control the rotational speed of the motor 314.

Next, a total q-axis current limit value $I_{qlim}$ will be described. The total q-axis current limit value $I_{qlim}$ varies depending on the value of the d-axis current $i_d$, the speed of the motor 314, etc. In terms of the demagnetization limit of the motor 314 in a low-speed range, the maximum current of the inverter 310, etc., the q-axis current limit value $I_{quim}$ is determined, for example, as in formula (1) below. In this description, the q-axis current limit value $I_{quim}$ is sometimes referred to as a "first limit value".

Formula 1

$$I_{qlim} = \sqrt{\left(\sqrt{3}\, I_{rmslim}\right)^2 - (i_d^*)^2} \tag{1}$$

In formula (1), $I_{rmslim}$ represents a phase current limit value expressed as an effective value, and $i_d^*$ represents a d-axis current command. $I_{rmslim}$ is typically set to be lower than a threshold for overcurrent interruption protection in the inverter 310 by about 10% to 208. In a high-speed range, the q-axis current $i_q$ that can be flowed decreases due to the effect of voltage saturation. It is well known that when a q-axis current command becomes excessive, control can become unstable due to a wind-up phenomenon in an integrator. In formula (1), a decrease in the maximum q-axis current with an increase in speed is not taken into consideration. Thus, a numerical formula is derived with a decrease in the maximum q-axis current taken into account. In a high-speed range, the relationship in an approximate expression of formula (2) is established with respect to $V_{om}$ where $V_{om}$ is the limit value of the dq-axis voltage.

Formula 2

$$(\Phi_a + L_d i_d)^2 + (L_q i_q)^2 \cong \left(\frac{V_{om}}{\omega_e}\right)^2 \tag{2}$$

In formula (2), $V_{om}$ is the radius of the voltage limit circle on the dq plane. Formula (2) is organized by substituting a steady-state voltage equation into $(V_d^*)^2 + (V_q^*)^2 = V_{om}^2$, ignoring a voltage drop due to the armature resistance. Here, formula (2) is solved for the q-axis current $i_q$ to obtain formula (3).

Formula 3

$$i_q = \pm \frac{1}{L_q} \sqrt{\left(\frac{V_{om}}{\omega_e}\right)^2 - (\Phi_a + L_d i_d)^2} \tag{3}$$

Thus, when the d-axis current $i_d$ is flowed to the limit of the limit value, the q-axis current limit value $I_{qlim}$ is expressed as in formula (4).

Formula 4

$$I_{qlim} = \frac{1}{L_q} \sqrt{\left(\frac{V_{om}}{\omega_e}\right)^2 - (\Phi_a + L_d I_{dlim})^2} \tag{4}$$

When the d-axis current $i_d$ is passed until the voltage is minimized, $\Phi_a + L_d I_{dlim} = 0$. At this time, formula (5) holds. In this case, it is found that the q-axis current limit value $I_{quim}$ decreases in inverse proportion to the electrical angular velocity $\omega_e$ of the motor 314.

Formula 5

$$I_{qlim} = \frac{V_{om}}{\omega_e L_q} \tag{5}$$

As a final conclusion, the q-axis current limit value $I_{quim}$ is set as in formula (6) with both formula (1) and formula (4) taken into account.

Formula 6

$$I_{qlim} = \mathrm{MIN}\left(\sqrt{\left(\sqrt{3}\, I_{rmslim}\right)^2 - (i_d^*)^2},\ \frac{1}{L_q}\sqrt{\left(\frac{V_{om}}{\omega_e}\right)^2 - (\Phi_a + L_d I_{dlim})^2}\right) \tag{6}$$

In formula (6), MIN is a function to select a minimum one.

Figure 2:
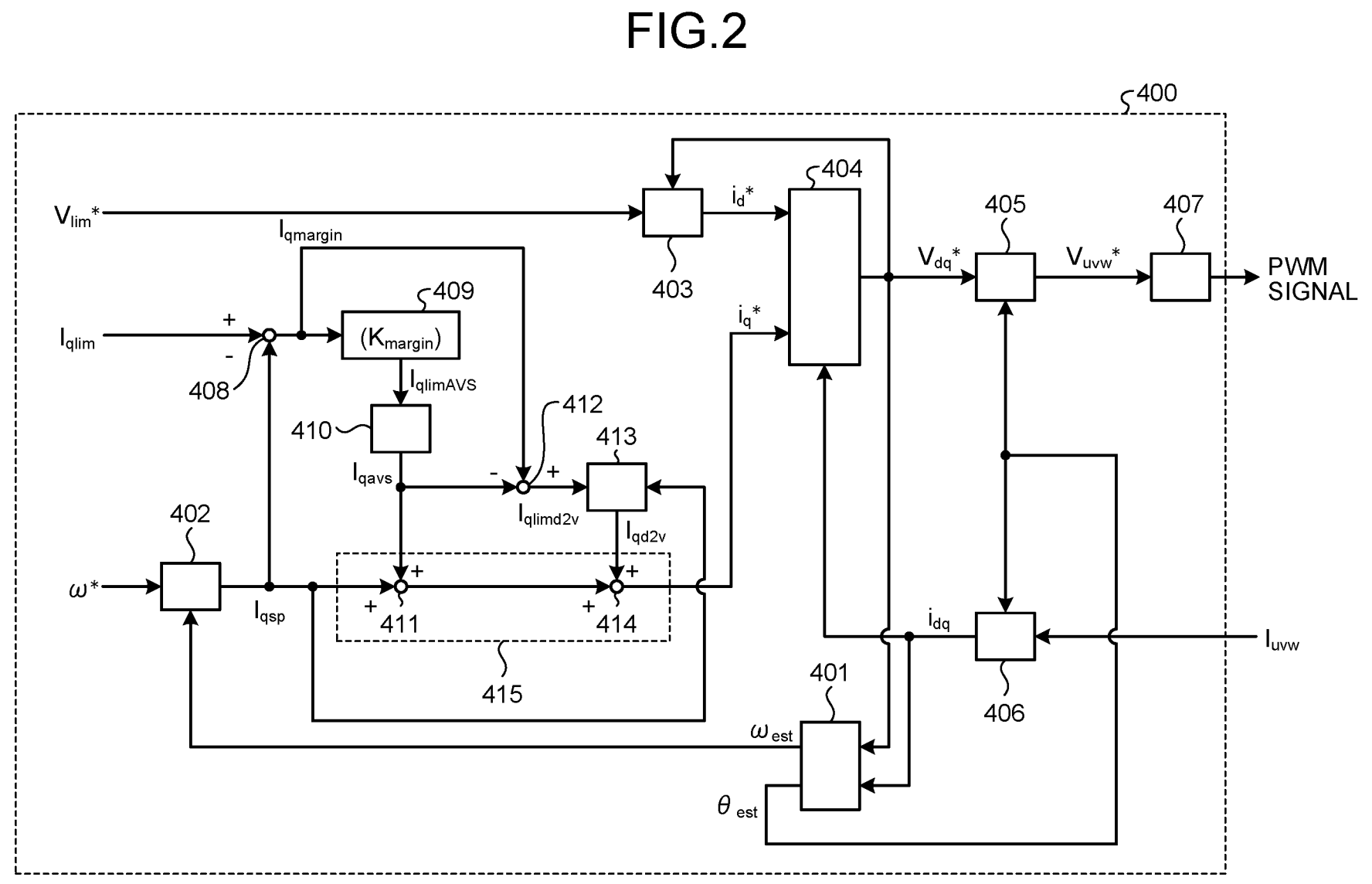

The configuration of the control unit 400 that performs the above operations will be described. FIG. 2 is a block diagram illustrating a configuration example of the control unit 400 included in the power converter 1 according to the first embodiment. The control unit 400 includes a rotor position estimation unit 401, a speed control unit 402, a flux-weakening control unit 403, a current control unit 404, coordinate transformation units 405 and 406, a PWM signal generation unit 407, a subtractor 408, an allocation ratio multiplier 409, a load pulsation compensation control unit 410, an adder 411, a subtractor 412, a power pulsation compensation control unit 413, and an adder 414. The adders 411 and 414 constitute a q-axis current command generation unit 415.

For a rotor (not illustrated) included in the motor 314, the rotor position estimation unit 401 estimates an estimated phase angle Gest that is the direction of the rotor magnetic pole on the dq axes, and an estimated speed $\omega_{est}$ that is the rotor speed, using a dq-axis voltage command vector $V_{dq}^*$ and a dq-axis current vector $i_{dq}$ for driving the motor 314.

The speed control unit 402 automatically adjusts, that is, generates a q-axis current command $I_{qsp}$ such that a speed command $\omega^*$ matches the estimated speed $\omega_{est}$. The q-axis current command $I_{qsp}$ is a torque current command for the above-described constant current load control. When the power converter 1 is used in an air conditioner or the like as a refrigeration cycle application apparatus, the speed command $\omega^*$ is based on, for example, a temperature detected by a temperature sensor (not illustrated), information indicating a set temperature specified from a remote controller that is an operating unit (not illustrated), operation mode selection information, instruction information on operation start and operation end, or the like. Examples of operation modes include heating, cooling, and dehumidification.

The flux-weakening control unit 403 automatically adjusts the d-axis current command $i_d^*$ such that the absolute value of the dq-axis voltage command vector $V_{dq}^*$ falls within the limit values of a voltage limit value $V_{lim}^*$. Flux-weakening control has two broad types: a method of calculating the d-axis current command $I_d^*$ from the voltage limit ellipse equation, and a method of calculating the d-axis current command $i_d^*$ such that a deviation in absolute value between the voltage limit value $V_{lim}^*$ and the dq-axis voltage command vector $V_{dq}^*$ becomes zero. Either method may be used.

The current control unit 404 automatically adjusts the dq-axis voltage command vector $V_{dq}*$ such that the dq-axis current vector $i_{dq}$ follows the d-axis current command $i_d*$ and a q-axis current command $i_q*$.

The coordinate transformation unit 405 coordinate-transforms the dq-axis voltage command vector $V_{dq}*$ from dq coordinates into an AC amount voltage command $V_{uvw}*$, according to the estimated phase angle $\theta_{est}$.

The coordinate transformation unit 406 coordinate-transforms the current $I_{uvw}$ flowing through the motor 314 from the AC amount into the dq-axis current vector $i_{dq}$ in the dq coordinates, according to the estimated phase angle $\theta_{est}$. As described above, for the current $I_{uvw}$ flowing through the motor 314, the control unit 400 can acquire, of the current values of the three phases output from the inverter 310, the current values of the two phases detected by the current detection units 313a and 313b, and the current value of the remaining one phase by calculation using the current values of the two phases.

The PWM signal generation unit 407 generates a PWM signal based on the voltage command $V_{uvw}*$ coordinate-transformed by the coordinate transformation unit 405. The control unit 400 outputs the PWM signal generated by the PWM signal generation unit 407 to the switching elements 311a to 311f of the inverter 310 to apply a voltage to the motor 314.

The subtractor 408 generates a q-axis current margin $I_{qmargin}$ that is the difference between the above-described q-axis current limit value $I_{qlim}$ and the absolute value of the q-axis current command $I_{qsp}$. When the value of the q-axis current command $I_{qsp}$ is positive, calculation of the absolute value is unnecessary. The q-axis current limit value $I_{qlim}$ is a limit value for the q-axis current command $i_q*$ to be input to the current control unit 404. The q-axis current margin $I_{qmargin}$ is the remainder when the amount of current of the q-axis current command $I_{qsp}$ required for the constant current load control is subtracted from the q-axis current limit value $I_{qlim}$, and is a value allocatable to the load pulsation compensation control and the power pulsation compensation control. Since $I_{qlim}-|I_{qsp}|$ is affected by speed pulsation, bus voltage pulsation, etc., the subtractor 408 may perform smoothing using a low-pass filter as in formula (7).

Formula 7

$$I_{qmargin} = \frac{1}{1 + T_S}(I_{qlim} - |I_{qsp}|) \tag{7}$$

In formula (7), T is the filter time constant and represents the reciprocal of the cutoff angular frequency, and s represents the Laplace transform variable. Next, the control unit 400 allocates the q-axis current margin $I_{qmargin}$ to the load pulsation compensation control and the power pulsation compensation control.

First, as shown in formula (8), the allocation ratio multiplier 409 multiplies the q-axis current margin $I_{qmargin}$ generated by the subtractor 408 by an allocation ratio $K_{margin}$ for each compensation control that include the load pulsation compensation control to reduce the vibration of the motor 314 and the power pulsation compensation control to reduce the capacitor current I3 of the capacitor 210. Thus, the allocation ratio multiplier 409 generates a current limit value $I_{qlimAVS}$ for the load pulsation compensation control.

Formula 8

$$I_{qlimAVS} = K_{margin} I_{qmargin} \tag{8}$$

Here, the allocation ratio $K_{margin}$ is the allocation rate of the q-axis current margin $I_{qmargin}$, and is a variable between zero and one inclusive. The allocation ratio $K_{margin}$ may be set according to the power state of the capacitor 210, the operating state of the motor 314, the operating state of an air conditioner when the power converter 1 is used in the air conditioner as a refrigeration cycle application apparatus, etc. Thus, the current limit value $I_{qlimAVS}$ for the load pulsation compensation control is set using the q-axis current margin $I_{qmargin}$.

The load pulsation compensation control unit 410 generates a load pulsation compensation q-axis current command $I_{qavs}$ using the current limit value $I_{qlimAVS}$ for the load pulsation compensation control. The load pulsation compensation q-axis current command $I_{qavs}$ is a torque current command for the load pulsation compensation control. Specifically, the load pulsation compensation control unit 410 performs the load pulsation compensation control within the current limit value $I_{qlimAVS}$ for the load pulsation compensation control generated by the allocation ratio multiplier 409, to generate the load pulsation compensation q-axis current command $I_{qavs}$. The load pulsation compensation q-axis current command $I_{qavs}$ is expressed as in formula (9). The magnitude relationships among the q-axis current margin $I_{qmargin}$, the current limit value $I_{qlimAVS}$ for the load pulsation compensation control, and the load pulsation compensation q-axis current command $I_{qavs}$ are $I_{qmargin} \geq I_{qlimAVS} \geq I_{qavs}$.

Formula 9

$$I_{qavs} = \sqrt{(I_{qavscos})^2 + (I_{qavssin})^2} \tag{9}$$

In the control of the first embodiment, the load pulsation compensation control unit 410 does not use up the current limit value $I_{qlimAVS}$ for the load pulsation compensation control. In response to this control, the subtractor 412 generates a limit value $I_{qlimd2v}$ for the power pulsation compensation control from the difference between the q-axis current margin $I_{qmargin}$ and the load pulsation compensation q-axis current command $I_{qavs}$ as shown in formula (10). Thus, the limit value $I_{qlimd2v}$ for the power pulsation compensation control is set using the q-axis current margin $I_{qmargin}$.

Formula 10

$$I_{qlimd2v} = I_{qmargin} - I_{qavs} \tag{10}$$

The power pulsation compensation control unit 413 generates a current amplitude $I_{qd2v}$ of the power pulsation compensation control, using the limit value $I_{qlimd2v}$ for the power pulsation compensation control. The current amplitude $I_{qd2v}$ of the power pulsation compensation control is a torque current command for the power pulsation compensation control. Specifically, the power pulsation compensation control unit 413 determines the current amplitude $I_{qd2v}$ of the power pulsation compensation control as in formula (11). When the absolute value of the q-axis current command $I_{qsp}$ is greater than or equal to the limit value $I_{qlimd2v}$ for the power pulsation compensation control, the power pulsation compensation control unit 413 selects the limit value $I_{qlimd2v}$ for the power pulsation compensation control as the current amplitude $I_{qd2v}$ of the power pulsation compensation control. When the absolute value of the q-axis current command $I_{qsp}$ is less than the limit value $I_{qlimd2v}$ for the power pulsation compensation control, the power pulsation compensation control unit 413 selects the absolute value of the q-axis current command $I_{qsp}$ as the current amplitude $I_{qd2v}$ of the power pulsation compensation control.

Formula 11

$$\text{if } I_{qlimd\,2v} \leq |I_{qsp}| \qquad (11)$$

$$\text{then } I_{qd\,2v} = I_{qlimd\,2v}$$

$$\text{else } I_{qd\,2v} = |I_{qsp}|$$

The q-axis current command generation unit 415 generates the q-axis current command $i_q^*$ using the q-axis current command $I_{qsp}$, the load pulsation compensation q-axis current command $I_{qavs}$, and the current amplitude $I_{qd2v}$ of the power pulsation compensation control. Specifically, in the q-axis current command generation unit 415, the adder 411 adds the q-axis current command $I_{qsp}$ and the load pulsation compensation q-axis current command $I_{qavs}$. The adder 414 adds the result of the addition by the adder 411, which is the q-axis current command $I_{qsp}$+the load pulsation compensation q-axis current command $I_{qavs}$, and the current amplitude $I_{qd2v}$ of the power pulsation compensation control. The q-axis current command generation unit 415 outputs the result of the addition by the adder 414 to the current control unit 404 as the q-axis current command $i_q^*$.

As described above, the allocation ratio multiplier 409 properly sets the allocation ratio $K_{margin}$ according to the circumstances, so that the control unit 400 can properly perform the power pulsation compensation control and the load pulsation compensation control while following the speed command $\omega^*$.

In the example of FIG. 2, the control unit 400 generates the current limit value $I_{qlimAVS}$ for the load pulsation compensation control, using the allocation ratio $K_{margin}$, and generates the limit value $I_{qlimd2v}$ for the power pulsation compensation control from the difference between the q-axis current margin $I_{qmargin}$ and the load pulsation compensation q-axis current command $I_{qavs}$, but the present invention is not limited thereto. In FIG. 2, the positions of the load pulsation compensation control unit 410 and the power pulsation compensation control unit 413 may be exchanged, and the control unit 400 may generate the limit value $I_{qlimd2v}$ for the power pulsation compensation control using the allocation ratio $K_{margin}$, and generate the current limit value $I_{qlimAVS}$ for the load pulsation compensation control from the difference between the q-axis current margin $I_{qmargin}$ and the current amplitude $I_{qd2v}$ of the power pulsation compensation control.

In the example of FIG. 2, the allocation ratio multiplier 409 multiplies the q-axis current margin $I_{qmargin}$, which is the difference, by the allocation ratio $K_{margin}$, to generate the current limit value $I_{qlimAVS}$ for the load pulsation compensation control. In this case, the current limit value $I_{qlimAVS}$ for the load pulsation compensation control is a value obtained by multiplying the q-axis current margin $I_{qmargin}$, which is the difference, by the allocation ratio $K_{margin}$, which is between zero and one inclusive. The limit value $I_{qlimd2v}$ for the power pulsation compensation control is a value obtained by subtracting the load pulsation compensation q-axis current command $I_{qavs}$ from the q-axis current margin $I_{qmargin}$, which is the difference. When the limit value $I_{qlimd2v}$ for the power pulsation compensation control is less than or equal to the absolute value of the q-axis current command $I_{qsp}$, the power pulsation compensation control unit 413 selects the limit value $I_{qlimd2v}$ for the power pulsation compensation control as the current amplitude $I_{qd2v}$ of the power pulsation compensation control. When the limit value $I_{qlimd2v}$ for the power pulsation compensation control is greater than the absolute value of the q-axis current command $I_{qsp}$, the power pulsation compensation control unit 413 selects the absolute value of the q-axis current command $I_{qsp}$ as the current amplitude $I_{qd2v}$ of the power pulsation compensation control.

On the other hand, in an example in which the positions of the load pulsation compensation control unit 410 and the power pulsation compensation control unit 413 are exchanged in FIG. 2, the allocation ratio multiplier 409 multiplies the q-axis current margin $I_{qmargin}$, which is the difference, by the allocation ratio $K_{margin}$, to generate the limit value $I_{qlimd2v}$ for the power pulsation compensation control. In this case, the limit value $I_{qlimd2v}$ for the power pulsation compensation control is a value obtained by multiplying the q-axis current margin $I_{qmargin}$, which is the difference, by the allocation ratio $K_{margin}$, which is between zero and one inclusive. The current limit value $I_{qlimAVS}$ for the load pulsation compensation control is a value obtained by subtracting the current amplitude $I_{qd2v}$ of the power pulsation compensation control from the q-axis current margin $I_{qmargin}$, which is the difference. When the current limit value $I_{qlimAVS}$ for the load pulsation compensation control is less than or equal to the absolute value of the q-axis current command $I_{qsp}$, the load pulsation compensation control unit 410 selects the current limit value $I_{qlimAVS}$ for the load pulsation compensation control as the load pulsation compensation q-axis current command $I_{qavs}$. When the current limit value $I_{qlimAVS}$ for the load pulsation compensation control is greater than the absolute value of the q-axis current command $I_{qsp}$, the power pulsation compensation control unit 413 selects the absolute value of the q-axis current command $I_{qsp}$ as the load pulsation compensation q-axis current command $I_{qavs}$.

Figure 3:
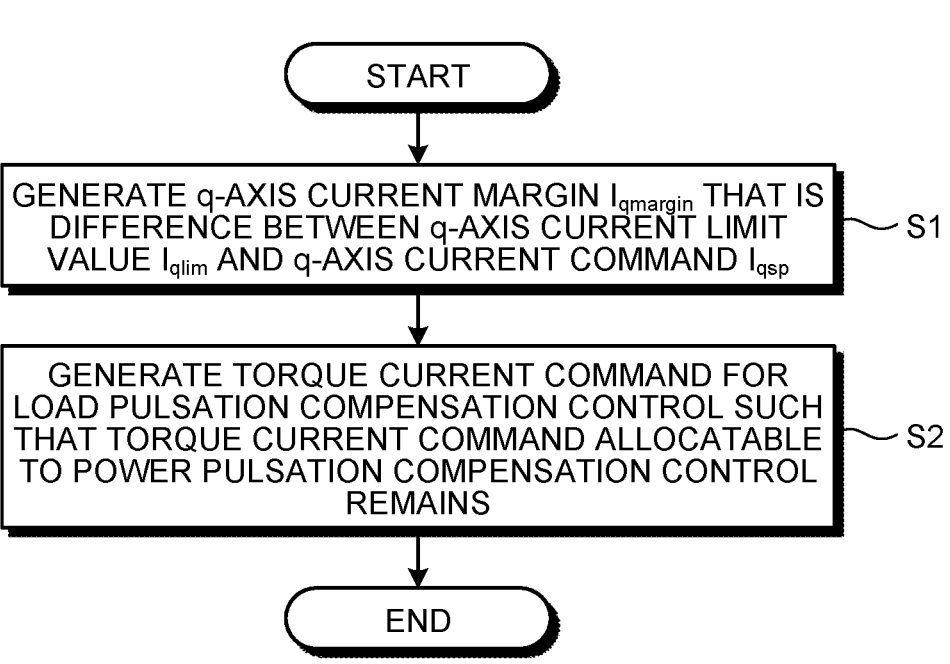
FIG. 3 is a first flowchart for explaining the operation of the main part of the power converter according to the first embodiment.

The operation of the control unit 400 described above will be described in an operation mode as viewed from the power converter 1. FIG. 3 is a first flowchart for explaining the operation of the main part of the power converter 1 according to the first embodiment.

The power converter 1 generates the q-axis current margin $I_{qmargin}$, which is the difference between the q-axis current limit value $I_{qlim}$ and the q-axis current command $I_{qsp}$ (step S1). The power converter 1 generates a torque current command for the load pulsation compensation control such that a torque current command allocatable to the power pulsation compensation control remains (step S2).

By step S1 above, the power converter 1 can preferentially perform the constant current load control to control the rotational speed of the motor 314. By step S2 above, the power converter 1 can strike a balance between the load pulsation compensation control and the power pulsation compensation control, to achieve both.

Figure 4:
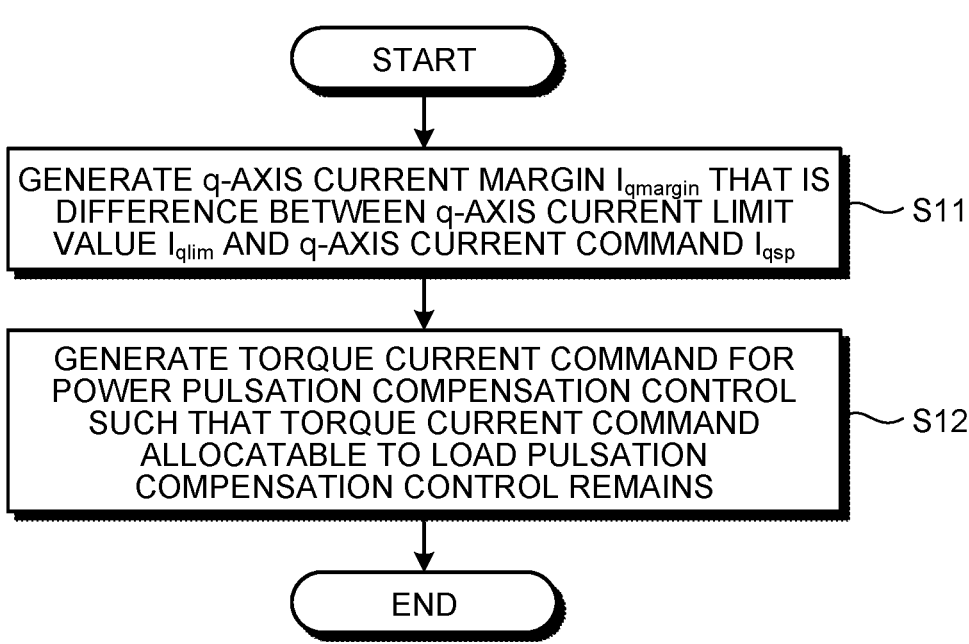
FIG. 4 is a second flowchart for explaining the operation of the main part of the power converter according to the first embodiment.

Furthermore, the operation of the control unit 400 described above can be expressed as in FIG. 4. FIG. 4 is a second flowchart for explaining the operation of the main part of the power converter 1 according to the first embodiment.

The power converter 1 generates the q-axis current margin $I_{qmargin}$, which is the difference between the q-axis current limit value $I_{qlim}$ and the q-axis current command $I_{qsp}$ (step S11). The power converter 1 generates a torque current command for the power pulsation compensation control such that a torque current command allocatable to the load pulsation compensation control remains (step S12).

By step S11 above, the power converter 1 can preferentially perform the constant current load control to control the rotational speed of the motor 314. By step S12 above, the power converter 1 can strike a balance between the load pulsation compensation control and the power pulsation compensation control, to achieve both.

Figure 5:
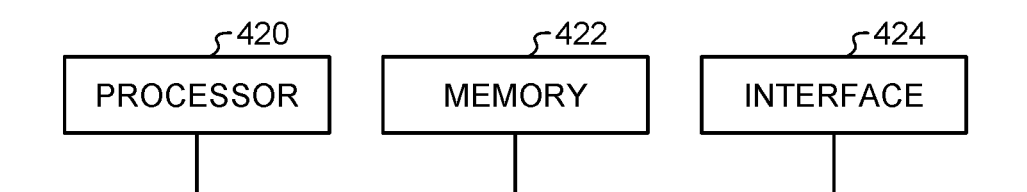
FIG. 5 is a block diagram illustrating an example of a hardware configuration that implements functions of the control unit according to the first embodiment.
Figure 6:
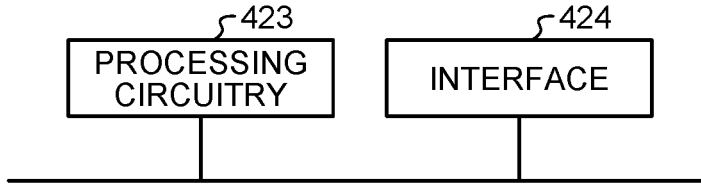
FIG. 6 is a block diagram illustrating another example of a hardware configuration that implements functions of the control unit according to the first embodiment.

Next, hardware configurations for implementing the functions of the control unit 400 according to the first embodiment will be described with reference to the drawings of FIGS. 5 and 6. FIG. 5 is a block diagram illustrating an example of a hardware configuration that implements the functions of the control unit 400 according to the first embodiment. FIG. 6 is a block diagram illustrating another example of a hardware configuration that implements the functions of the control unit 400 according to the first embodiment.

To implement some or all of the functions of the control unit 400, as illustrated in FIG. 5, the configuration can include a processor 420 that performs operations, a memory 422 that stores a program to be read by the processor 420, and an interface 424 that inputs and outputs signals.

The processor 420 is an example of an arithmetic means. The processor 420 may be an arithmetic means called a microprocessor, a microcomputer, a central processing unit (CPU), or a digital signal processor (DSP). The memory 422 can be exemplified by nonvolatile or volatile semiconductor memory such as random-access memory (RAM), read-only memory (ROM), flash memory, an erasable programmable ROM (EPROM), or an electrically EPROM (EEPROM) (registered trademark), or a magnetic disk, a flexible disk, an optical disk, a compact disk, a mini disk, or a digital versatile disc (DVD).

The memory 422 stores a program to execute the functions of the control unit 400. The processor 420 exchanges necessary information via the interface 424. The processor 420 executes the program stored in the memory 422. The processor 420 refers to data stored in the memory 422. Thus, the above-described processing can be executed. The results of operations by the processor 420 can be stored in the memory 422.

The processor 420 and the memory 422 illustrated in FIG. 5 may be replaced with processing circuitry 423 as in FIG. 6. The processing circuitry 423 corresponds to a single circuit, a combined circuit, an application-specific integrated circuit (ASIC), a field-programmable gate array (FPGA), or a combination of them. Information input to the processing circuitry 423 and information output from the processing circuitry 423 can be obtained via the interface 424.

Part of the processing in the control unit 400 may be performed by the processing circuitry 423, and the processing not performed by the processing circuitry 423 may be performed by the processor 420 and the memory 422.

As described above, in the power converter according to the first embodiment, the control unit performs the load pulsation compensation control to reduce the vibration of the motor and the power pulsation compensation control to reduce the charging and discharging current of the capacitor while preferentially performing the constant current load control to control the rotational speed of the motor. The control unit generates a torque current command for the load pulsation compensation control such that a torque current command allocatable to the power pulsation compensation control remains. Alternatively, the control unit generates a torque current command for the power pulsation compensation control such that a torque current command allocatable to the load pulsation compensation control remains. This can reduce the deterioration of the smoothing capacitor while reducing or preventing the device from becoming larger. Furthermore, the load pulsation compensation control and the power pulsation compensation control can be balanced, and both can be achieved.

Second Embodiment

Figure 7:
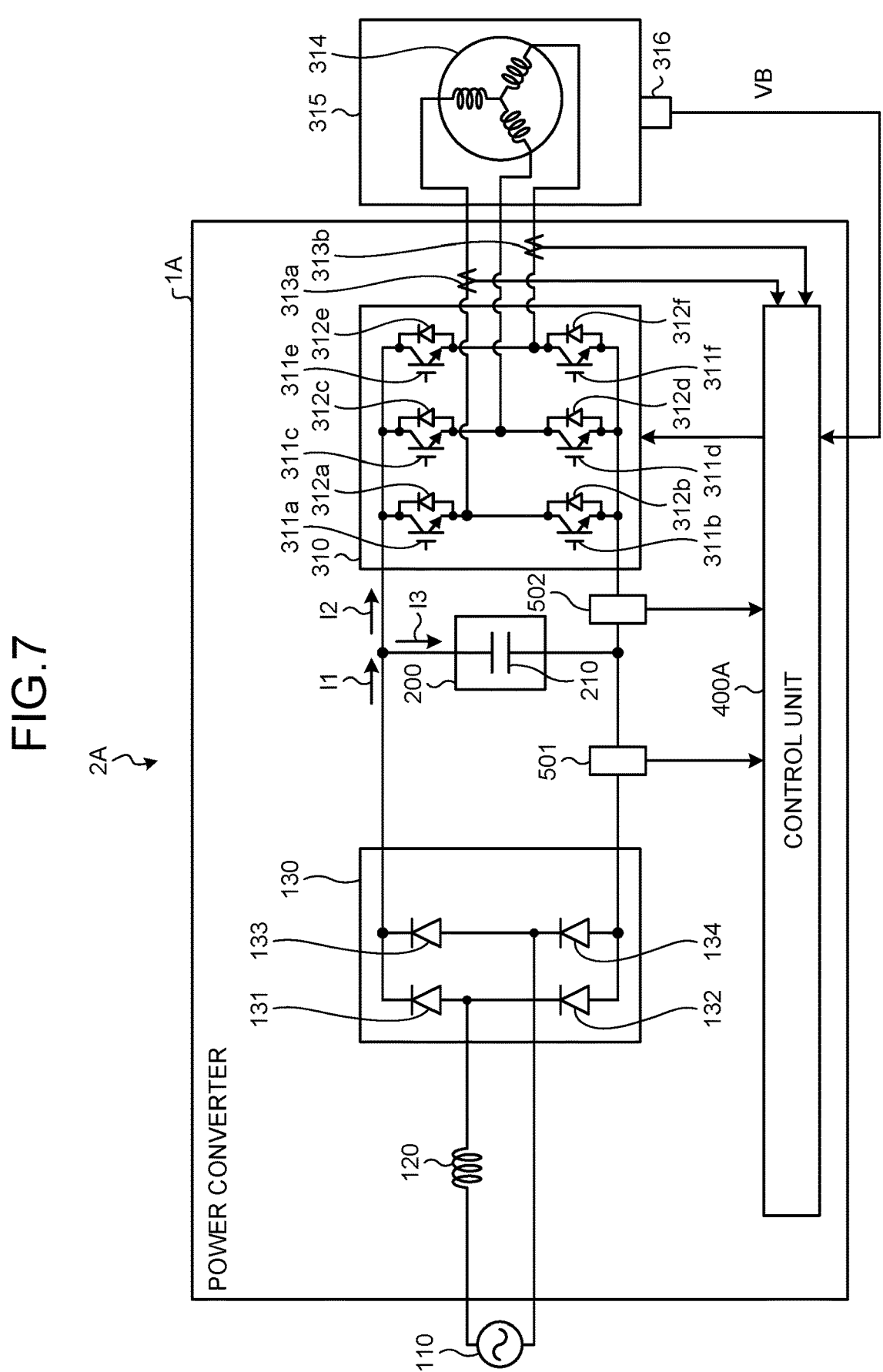
FIG. 7 is a diagram illustrating a configuration example of a power converter according to a second embodiment.

FIG. 7 is a diagram illustrating a configuration example of a power converter 1A according to a second embodiment. In the power converter 1A illustrated in FIG. 7, the control unit 400 is replaced with a control unit 400A. The power converter 1A and the motor 314 included in the compressor 315 constitute a motor drive device 2A. A vibration sensor 316 that detects the vibration level of the compressor 315 is added to the compressor 315 to be driven by the motor drive device 2A. A detected value VB of the vibration sensor 316 is input to the control unit 400A. The other configuration is the same as or equivalent to that of the power converter 1 illustrated in FIG. 1. The same or equivalent components are denoted by the same reference numerals, and redundant description is omitted.

Figure 8:
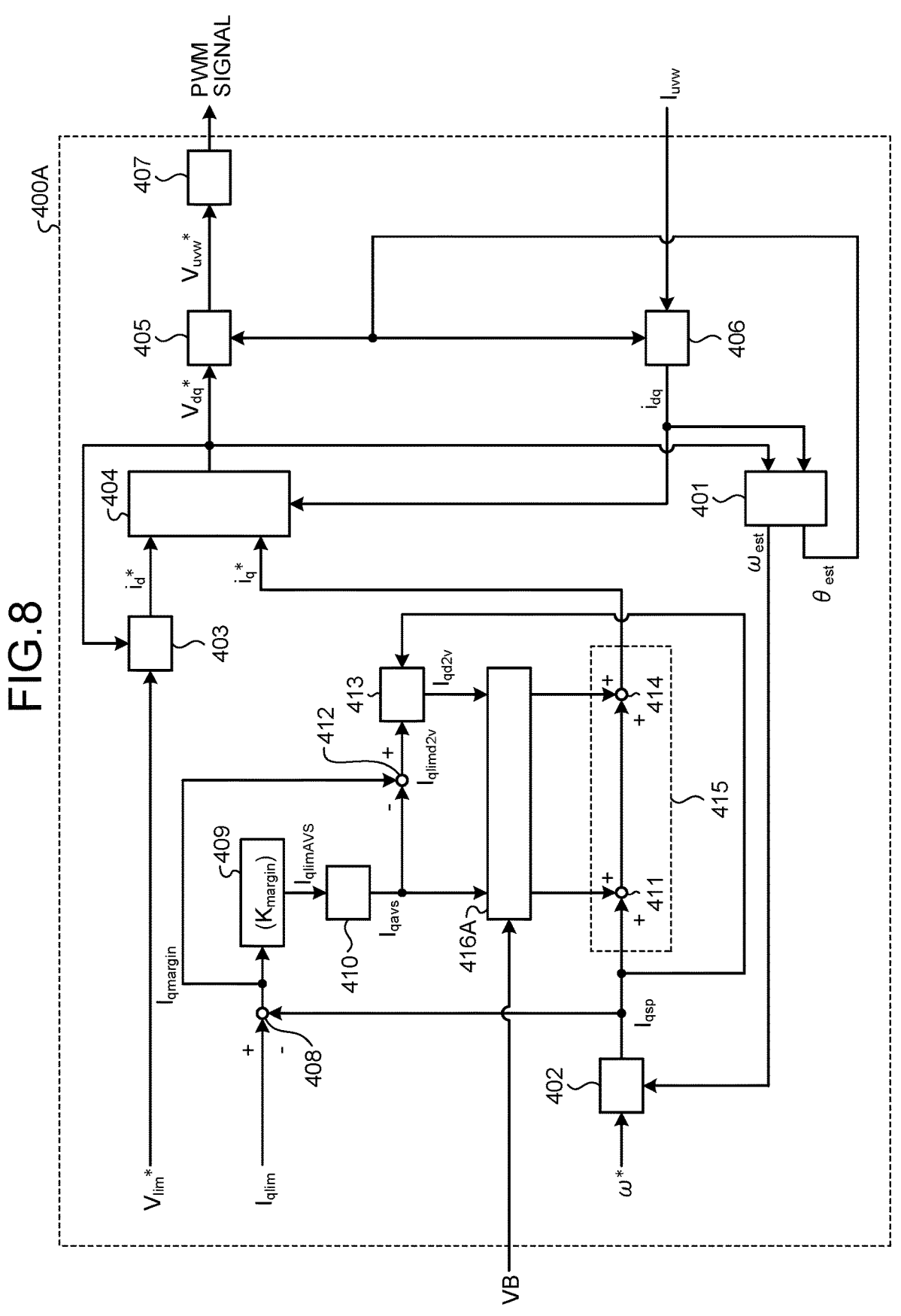
FIG. 8 is a block diagram illustrating a configuration example of a control unit included in the power converter according to the second embodiment.

FIG. 8 is a block diagram illustrating a configuration example of the control unit 400A included in the power converter 1A according to the second embodiment. In the control unit 400A illustrated in FIG. 8, as compared with the control unit 400 illustrated in FIG. 2, an adjustment unit 416A is added between the load pulsation compensation control unit 410 and the power pulsation compensation control unit 413, and the q-axis current command generation unit 415. The adjustment unit 416A receives input of the load pulsation compensation q-axis current command $I_{qavs}$, the current amplitude $I_{qd2v}$ of the power pulsation compensation control, and the detected value VB of the vibration sensor 316. The other configuration is the same as or equivalent to that of the control unit 400 illustrated in FIG. 2. The same or equivalent components are denoted by the same reference numerals, and redundant description is omitted.

The adjustment unit 416A adjusts the value of the load pulsation compensation q-axis current command $I_{qavs}$ based on the detected value VB of the vibration sensor 316. Specifically, the adjustment unit 416A adjusts the value of the load pulsation compensation q-axis current command $I_{qavs}$ such that the detected value VB of the vibration sensor 316 becomes less than or equal to a threshold. The threshold referred to here is a set value determined in terms of preventing fatigue failure caused by vibration in the compressor 315. When the detected value VB of the vibration sensor 316 exceeds the threshold, the adjustment unit 416A adjusts the value of the load pulsation compensation q-axis current command $I_{qavs}$ to positively perform the load pulsation compensation control. The adjustment unit 416A also adjusts the value of the current amplitude $I_{qd2v}$ of the power pulsation compensation control by the amount by which the value of the load pulsation compensation q-axis current command $I_{qavs}$ has been adjusted. The adjusted load pulsation compensation q-axis current command $I_{qavs}$ is output to the adder 411 of the q-axis current command generation unit 415. The adjusted current amplitude $I_{qd2v}$ of the power pulsation compensation control is output to the adder 414 of the q-axis current command generation unit 415. When the detected value VB of the vibration sensor 316 is less than or equal to the threshold, the output of the load pulsation compensation control unit 410 is directly input to the adder 411 without performing the processing of the adjustment unit 416A, and the output of the power pulsation compensation control unit 413 is directly input to the adder 414 without performing the processing of the adjustment unit 416A.

The operation of the control unit 400A described above will be described in an operation mode as viewed from the power converter 1A. FIG. 9 is a flowchart for explaining the operation of the main part of the power converter 1A according to the second embodiment.

The power converter 1A acquires the detected value VB of the vibration sensor 316 (step S21). The power converter 1A generates the q-axis current margin $I_{qmargin}$, which is the difference between the q-axis current limit value $I_{qlim}$ and the q-axis current command $I_{qsp}$ (step S22). The power converter 1A generates a torque current command for the load pulsation compensation control such that a torque current command allocatable to the power pulsation compensation control remains, and adjusts the torque current command for the load pulsation compensation control such that the detected value VB of the vibration sensor 316 becomes less than or equal to the threshold (step S23).

By step S22 above, the power converter 1A can preferentially perform the constant current load control to control the rotational speed of the motor 314. Further, by steps S21 and S23 above, the power converter 1A can reduce the possibility that the compressor 315 is damaged by fatigue failure while achieving both the load pulsation compensation control and the power pulsation compensation control.

As described above, in the power converter according to the second embodiment, the control unit performs the load pulsation compensation control to reduce the vibration of the motor and the power pulsation compensation control to reduce the charging and discharging current of the capacitor while preferentially performing the constant current load control to control the rotational speed of the motor. Further, when generating a torque current command for the load pulsation compensation control such that a torque current command allocatable to the power pulsation compensation control remains, the control unit adjusts the torque current command for the load pulsation compensation control such that the detected value of the vibration sensor becomes less than or equal to the threshold. This can reduce the possibility that the apparatus in which the motor is installed is damaged by fatigue failure while enjoying the effects of the first embodiment.

Third Embodiment

Figure 10:
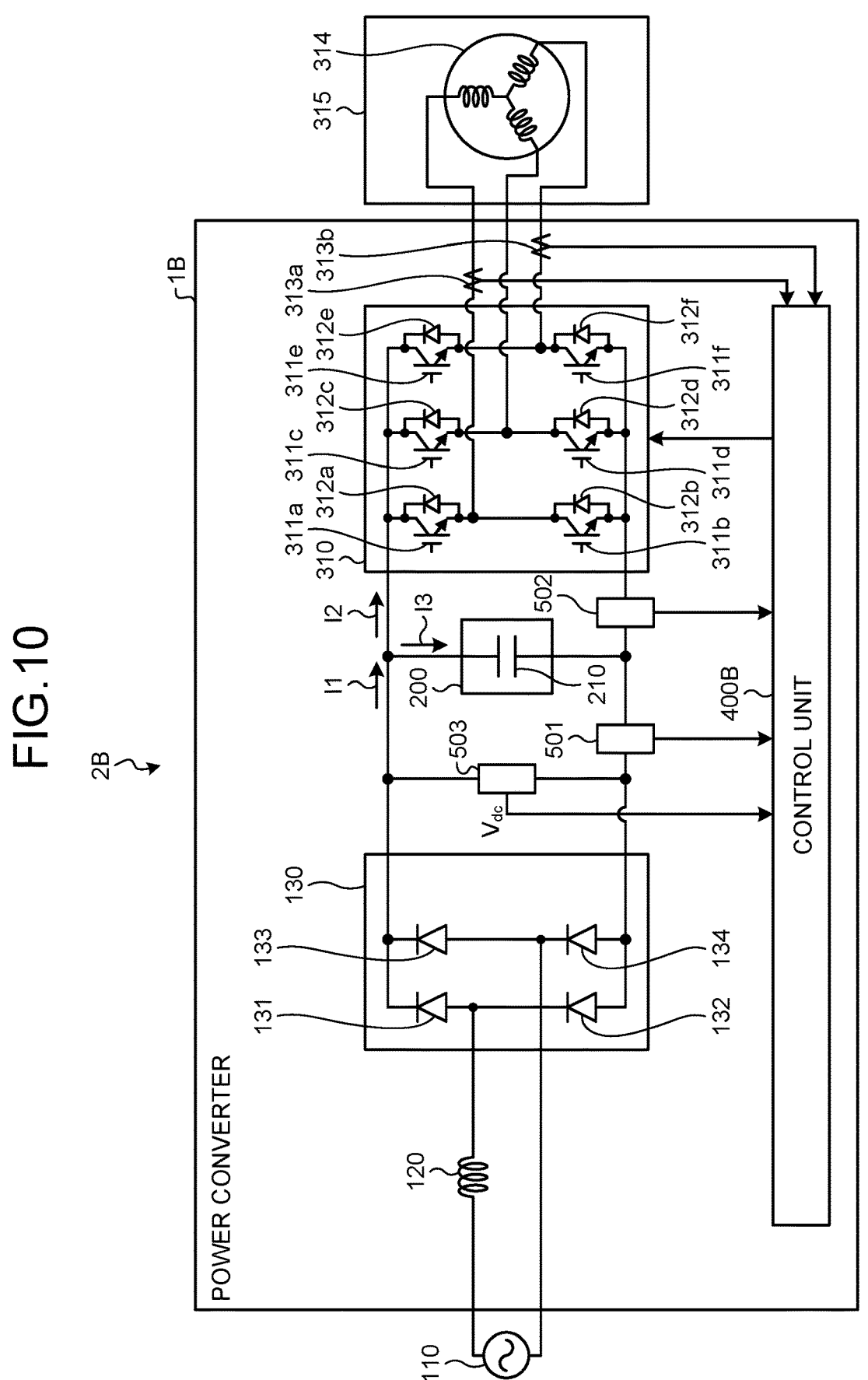
FIG. 10 is a diagram illustrating a configuration example of a power converter according to a third embodiment.

FIG. 10 is a diagram illustrating a configuration example of a power converter 1B according to a third embodiment. In the power converter 1B illustrated in FIG. 10, the control unit 400 is replaced with a control unit 400B. The power converter 1B and the motor 314 included in the compressor 315 constitute a motor drive apparatus 2B. A voltage detection unit 503 that detects the capacitor voltage $V_{dc}$ is added to the power converter 1B. A detected value of the capacitor voltage $V_{dc}$ detected by the voltage detection unit 503 is input to the control unit 400B. The other configuration is the same as or equivalent to that of the power converter 1 illustrated in FIG. 1. The same or equivalent components are denoted by the same reference numerals, and redundant description is omitted.

Figure 11:
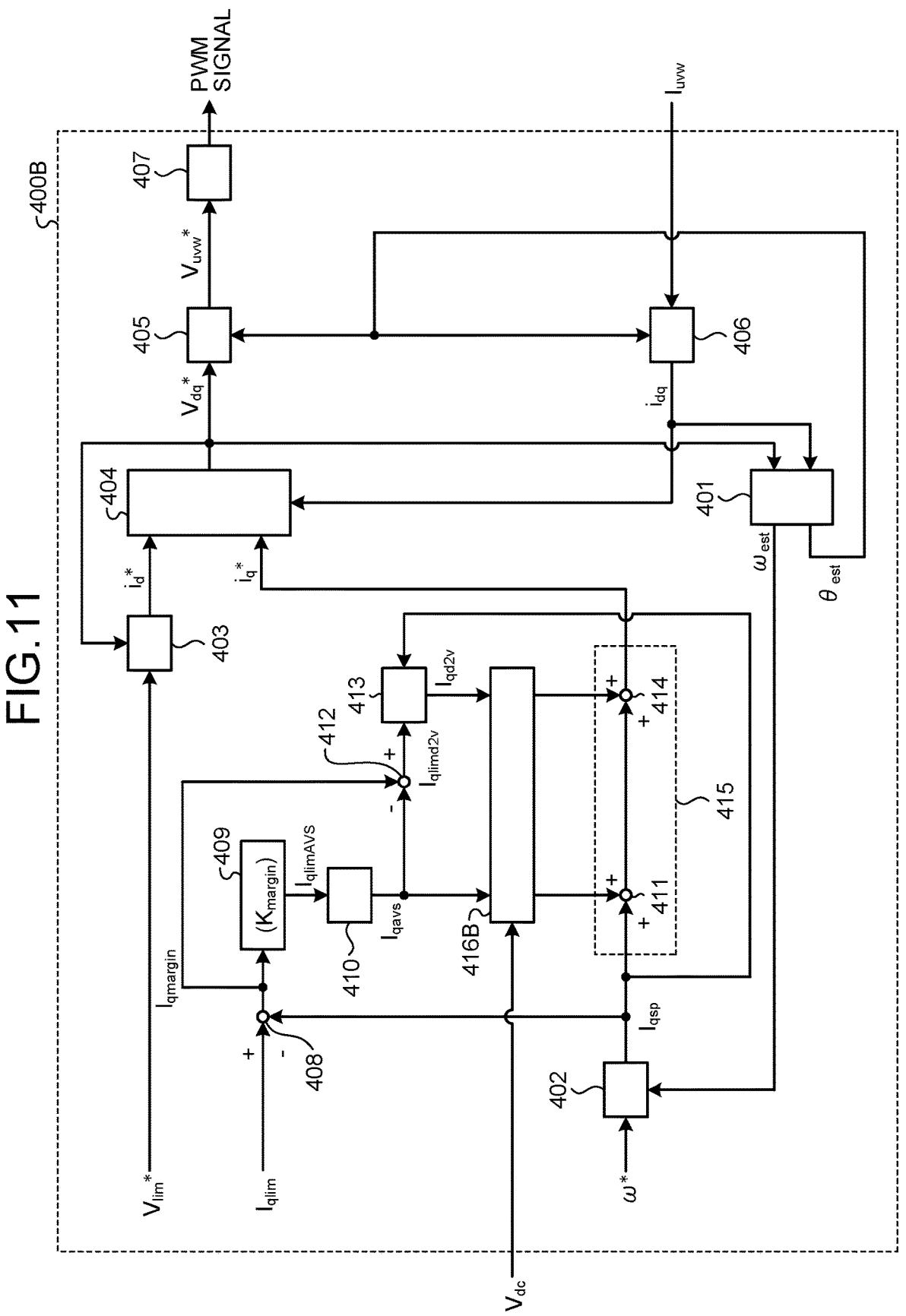
FIG. 11 is a block diagram illustrating a configuration example of a control unit included in the power converter according to the third embodiment.

FIG. 11 is a block diagram illustrating a configuration example of the control unit 400B included in the power converter 1B according to the third embodiment. In the control unit 400B illustrated in FIG. 11, as compared with the control unit 400 illustrated in FIG. 2, an adjustment unit 416B is added between the load pulsation compensation control unit 410 and the power pulsation compensation control unit 413, and the q-axis current command generation unit 415. The adjustment unit 416B receives input of the load pulsation compensation q-axis current command $I_{qavs}$, the current amplitude $I_{qd2v}$ of the power pulsation compensation control, and the detected value of the capacitor voltage $V_{dc}$. The other configuration is the same as or equivalent to that of the control unit 400 illustrated in FIG. 2. The same or equivalent components are denoted by the same reference numerals, and redundant description is omitted.

The adjustment unit 416B calculates the capacitor current I3 by formula (12) below, based on the detected value of the capacitor voltage $V_{dc}$ and the capacitance C of the capacitor 210.

Formula 12

$$I3 = C \cdot (dV_{dc}/dt) \tag{12}$$

The adjustment unit 416B adjusts the value of the current amplitude $I_{qd2v}$ of the power pulsation compensation control, based on a calculated value of the capacitor current I3. Specifically, the adjustment unit 416B adjusts the value of the current amplitude $I_{qd2v}$ of the power pulsation compensation control such that the calculated value of the capacitor current I3 becomes less than or equal to a threshold. The threshold referred to here is a set value determined by the rated ripple current of the capacitor 210. When the calculated value of the capacitor current I3 exceeds the threshold, the adjustment unit 416B adjusts the value of the current amplitude $I_{qd2v}$ of the power pulsation compensation control, to positively perform the power pulsation compensation control. The adjustment unit 416B also adjusts the value of the load pulsation compensation q-axis current command $I_{qavs}$ by the amount by which the value of the current amplitude $I_{qd2v}$ of the power pulsation compensation control has been adjusted. The adjusted load pulsation compensation q-axis current command $I_{qavs}$ is output to the adder 411 of the q-axis current command generation unit 415. The adjusted current amplitude $I_{qd2v}$ of the power pulsation compensation control is output to the adder 414 of the q-axis current command generation unit 415. When the calculated value of the capacitor current I3 is less than or equal to the threshold, the output of the load pulsation compensation control unit 410 is directly input to the adder 411 without performing the processing of the adjustment unit 416B, and the output of the power pulsation compensation control unit 413 is directly input to the adder 414 without performing the processing of the adjustment unit 416B.

The operation of the control unit 400B described above will be described in an operation mode as viewed from the power converter 1B. FIG. 12 is a flowchart for explaining the operation of the main part of the power converter 1B according to the third embodiment.

The power converter 1B acquires the detected value of the capacitor voltage $V_{dc}$ (step S31). The power converter 18 calculates the capacitor current I3 based on the detected value of the capacitor voltage $V_{dc}$ and the capacitance C of the capacitor 210 (step S32). The power converter 1B generates the q-axis current margin $I_{qmargin}$, which is the difference between the q-axis current limit value $I_{qlim}$ and the q-axis current command $I_{qsp}$ (step S33). The power converter 1B generates a torque current command for the power pulsation compensation control such that a torque current command allocatable to the load pulsation compensation control remains, and adjusts the torque current command for the power pulsation compensation control such that the calculated value of the capacitor current I3 becomes less than or equal to the threshold (step S34).

By step S33 above, the power converter 1B can preferentially perform the constant current load control to control the rotational speed of the motor 314. Further, by steps S31, S32, and S34 above, the power converter 1B can extend the life of the capacitor 210 while achieving both the load pulsation compensation control and the power pulsation compensation control.

As described above, in the power converter according to the third embodiment, the control unit performs the load pulsation compensation control to reduce the vibration of the motor and the power pulsation compensation control to reduce the charging and discharging current of the capacitor while preferentially performing the constant current load control to control the rotational speed of the motor. Further, when generating a torque current command for the power pulsation compensation control such that a torque current command allocatable to the load pulsation compensation control remains, the control unit adjusts the torque current command for the power pulsation compensation control such that the calculated value of the capacitor current becomes less than or equal to the threshold. This can extend the life of the capacitor while obtaining the effects of the first embodiment.

Fourth Embodiment

Figure 13:
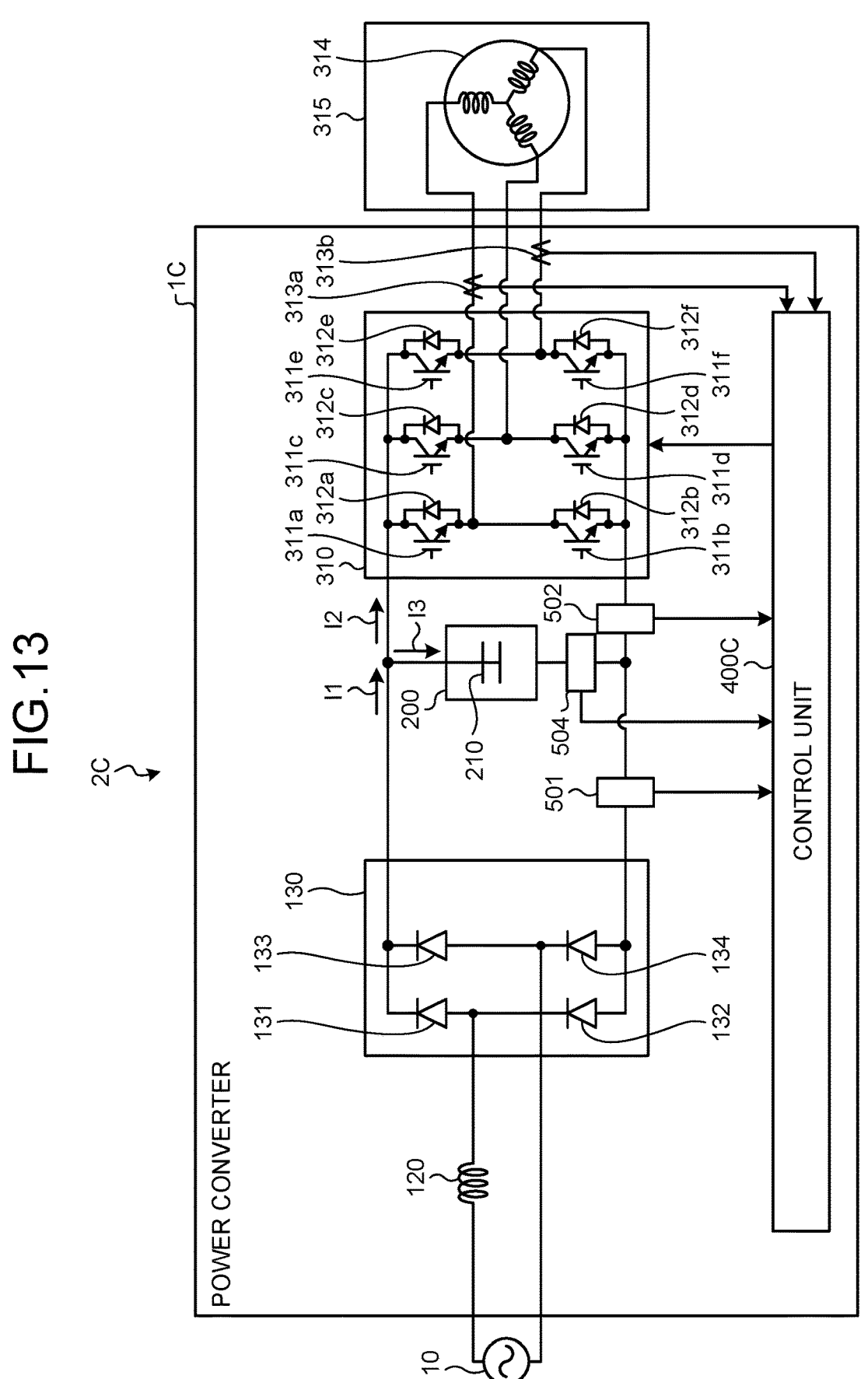
FIG. 13 is a diagram illustrating a configuration example of a power converter according to a fourth embodiment.

FIG. 13 is a diagram illustrating a configuration example of a power converter 1C according to a fourth embodiment. In the power converter 1C illustrated in FIG. 13, the control unit 400 is replaced with a control unit 400C. The power converter 1C and the motor 314 included in the compressor 315 constitute a motor drive device 2C. A current detection unit 504 that detects the capacitor current I3 is added to the power converter 1C. A detected value of the capacitor current I3 detected by the current detection unit 504 is input to the control unit 400C. The other configuration is the same as or equivalent to that of the power converter 1 illustrated in FIG. 1. The same or equivalent components are denoted by the same reference numerals, and redundant description is omitted.

Figure 14:
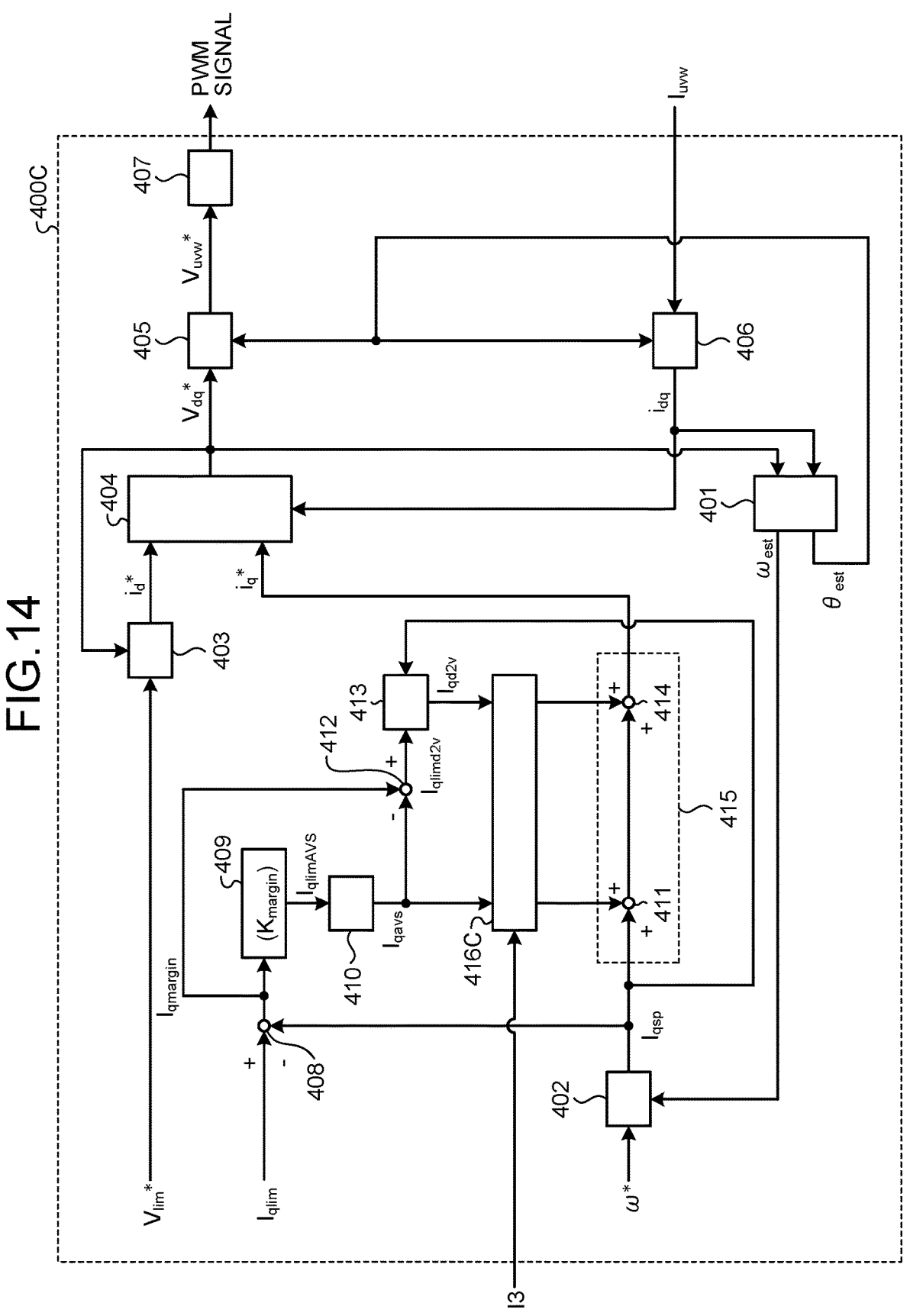
FIG. 14 is a block diagram illustrating a configuration example of a control unit included in the power converter according to the fourth embodiment.

FIG. 14 is a block diagram illustrating a configuration example of the control unit 400C included in the power converter 1C according to the fourth embodiment. In the control unit 400C illustrated in FIG. 14, as compared with the control unit 400 illustrated in FIG. 2, an adjustment unit 416C is added between the load pulsation compensation control unit 410 and the power pulsation compensation control unit 413, and the q-axis current command generation unit 415. The adjustment unit 416C receives input of the load pulsation compensation q-axis current command $I_{qavs}$, the current amplitude $I_{qd2v}$ of the power pulsation compensation control, and the detected value of the capacitor current I3. The other configuration is the same as or equivalent to that of the control unit 400 illustrated in FIG. 2. The same or equivalent components are denoted by the same reference numerals, and redundant description is omitted.

The adjustment unit 416C adjusts the value of the current amplitude $I_{qd2v}$ of the power pulsation compensation control, based on the detected value of the capacitor current I3. Specifically, the adjustment unit 416C adjusts the value of the current amplitude $I_{qd2v}$ of the power pulsation compensation control such that the detected value of the capacitor current I3 becomes less than or equal to a threshold. The threshold referred to here is a set value determined by the rated ripple current of the capacitor 210. When the detected value of the capacitor current I3 exceeds the threshold, the adjustment unit 416C adjusts the value of the current amplitude $I_{qd2v}$ of the power pulsation compensation control, to positively perform the power pulsation compensation control. The adjustment unit 416C also adjusts the value of the load pulsation compensation q-axis current command $I_{qavs}$ by the amount by which the value of the current amplitude $I_{qd2v}$ of the power pulsation compensation control has been adjusted. The adjusted load pulsation compensation q-axis current command $I_{qavs}$ is output to the adder 411 of the q-axis current command generation unit 415. The adjusted current amplitude $I_{qd2v}$ of the power pulsation compensation control is output to the adder 414 of the q-axis current command generation unit 415. When the calculated value of the capacitor current I3 is less than or equal to the threshold, the output of the load pulsation compensation control unit 410 is directly input to the adder 411 without performing the processing of the adjustment unit 416C, and the output of the power pulsation compensation control unit 413 is directly input to the adder 414 without performing the processing of the adjustment unit 416C.

The operation of the control unit 400C described above will be described in an operation mode as viewed from the power converter 1C. FIG. 15 is a flowchart for explaining the operation of the main part of the power converter 1C according to the fourth embodiment.

The power converter 1C acquires the detected value of the capacitor current I3 (step S41). The power converter 1C generates the q-axis current margin $I_{qmargin}$, which is the difference between the q-axis current limit value $I_{quim}$ and the q-axis current command $I_{qsp}$ (step S42). The power converter 1C generates a torque current command for the power pulsation compensation control such that a torque current command allocatable to the load pulsation compensation control remains, and adjusts the torque current command for the power pulsation compensation control such that the detected value of the capacitor current I3 becomes less than or equal to the threshold (step S43).

By step S42 above, the power converter 1C can preferentially perform the constant current load control to control the rotational speed of the motor 314. Further, by steps S41 and S43 above, the power converter 1C can extend the life of the capacitor 210 while achieving both the load pulsation compensation control and the power pulsation compensation control.

As described above, in the power converter according to the fourth embodiment, the control unit performs the load pulsation compensation control to reduce the vibration of the motor and the power pulsation compensation control to reduce the charging and discharging current of the capacitor while preferentially performing the constant current load control to control the rotational speed of the motor. Further, when generating a torque current command for the power pulsation compensation control such that a torque current command allocatable to the load pulsation compensation control remains, the control unit adjusts the torque current command for the power pulsation compensation control such that the detected value of the capacitor current becomes less than or equal to the threshold. This can extend the life of the capacitor while obtaining the effects of the first embodiment.

Fifth Embodiment

Figure 16:
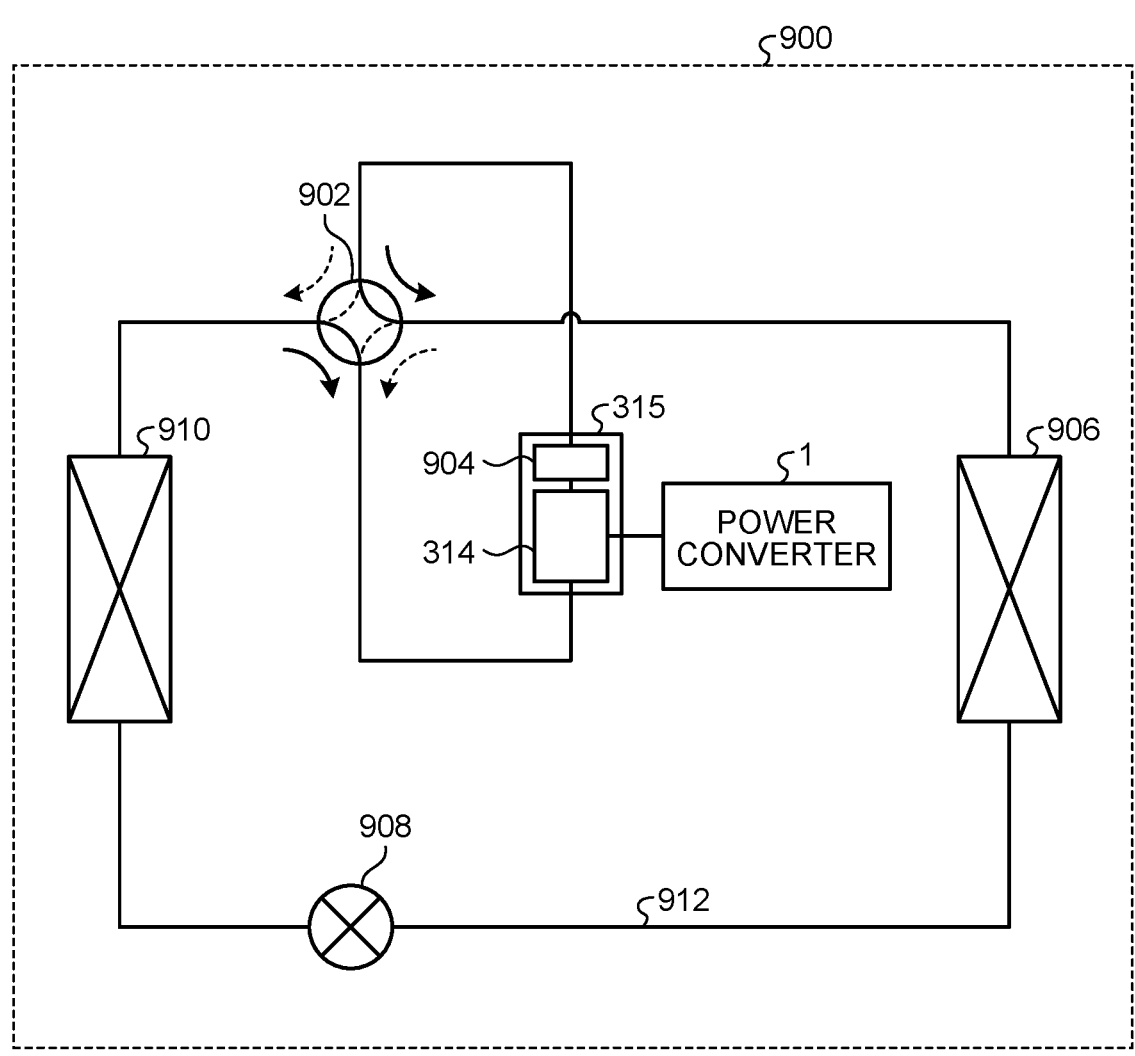
FIG. 16 is a diagram illustrating a configuration example of a refrigeration cycle application apparatus according to a fifth embodiment.

FIG. 16 is a diagram illustrating a configuration example of a refrigeration cycle application apparatus 900 according to a fifth embodiment. The refrigeration cycle application apparatus 900 according to the fifth embodiment includes the power converter 1 described in the first embodiment. The refrigeration cycle application apparatus 900 according to the fifth embodiment can be applied to a product including a refrigeration cycle, such as an air conditioner, a refrigerator, a freezer, or a heat pump water heater. In FIG. 16, components having the same functions as those of the first embodiment are denoted by the same reference numerals as those of the first embodiment.

In the refrigeration cycle application apparatus 900, the compressor 315 incorporating the motor 314 in the first embodiment, a four-way valve 902, an indoor heat exchanger 906, an expansion valve 908, and an outdoor heat exchanger 910 are installed via refrigerant piping 912.

A compression mechanism 904 that compresses a refrigerant and the motor 314 that operates the compression mechanism 904 are provided inside the compressor 315.

The refrigeration cycle application apparatus 900 can perform heating operation or cooling operation by the switching operation of the four-way valve 902. The compression mechanism 904 is driven by the motor 314 that is variable-speed controlled.

During the heating operation, as indicated by solid arrows, the refrigerant is pressurized and delivered by the compression mechanism 904, passes through the four-way valve 902, the indoor heat exchanger 906, the expansion valve 908, the outdoor heat exchanger 910, and the four-way valve 902, and returns to the compression mechanism 904.

During the cooling operation, as indicated by dashed arrows, the refrigerant is pressurized and delivered by the compression mechanism 904, passes through the four-way valve 902, the outdoor heat exchanger 910, the expansion valve 908, the indoor heat exchanger 906, and the four-way valve 902, and returns to the compression mechanism 904.

During the heating operation, the indoor heat exchanger 906 acts as a condenser to release heat, and the outdoor heat exchanger 910 acts as an evaporator to absorb heat. During the cooling operation, the outdoor heat exchanger 910 acts as a condenser to release heat, and the indoor heat exchanger 906 acts as an evaporator to absorb heat. The expansion valve 908 decompresses and expands the refrigerant.

The refrigeration cycle application apparatus 900 according to the fifth embodiment has been described as including the power converter 1 described in the first embodiment, but is not limited thereto. The power converter 1A illustrated in FIG. 7 may be included, the power converter 1B illustrated in FIG. 10 may be included, or the power converter 1C illustrated in FIG. 13 may be included. A power converter other than the power converters 1, 1A, 1B, and 1C may be used as long as the control method in the first to fourth embodiments can be applied thereto.

The configurations described in the above embodiments illustrate an example, and can be combined with another known art. The embodiments can be combined with each other. The configurations can be partly omitted or changed without departing from the gist.

REFERENCE SIGNS LIST 1, 1A, 1B, 1C power converter; 2, 2A, 2B, 2C motor drive device; 110 commercial power source; 120 reactor; 130 rectifier unit; 131 to 134 rectifier element; 200 smoothing unit; 210 capacitor; 310 inverter; 311a to 311f switching element; 312a to 312f freewheeling diode; 313a, 313b, 501, 502, 504 current detection unit; 314 motor; 315 compressor; 316 vibration sensor; 400, 400A, 400B, 400C control unit; 401 rotor position estimation unit; 402 speed control unit; 403 flux-weakening control unit; 404 current control unit; 405, 406 coordinate transformation unit; 407 PWM signal generation unit; 408, 412 subtractor; 409 allocation ratio multiplier; 410 load pulsation compensation control unit; 411, 414 adder; 413 power pulsation compensation control unit; 415 q-axis current command generation unit; 416A, 416B, 416C adjustment unit; 420 processor; 422 memory; 423 processing circuitry; 424 interface; 503 voltage detection unit; 900 refrigeration cycle application apparatus; 902 four-way valve; 904 compression mechanism; 906 indoor heat exchanger; 908 expansion valve; 910 outdoor heat exchanger; 912 refrigerant piping.

The invention claimed is:

1. A power converter, comprising:
a rectifier rectifying first AC power supplied from a commercial power source;
a capacitor connected to an output end of the rectifier;
an inverter connected across the capacitor, the inverter generating second AC power and outputting the second AC power to a motor; and
processing circuitry controlling operation of the inverter such that pulsation according to a power state of the capacitor is superimposed on a drive pattern of the motor, to reduce a charging and discharging current of the capacitor, the power state of the capacitor including at least one of a rectified current flowing from the rectifier, an inverter input current flowing into the inverter, a capacitor current that is the charging and discharging current of the capacitor, and a capacitor voltage that is a voltage of the capacitor, wherein
the processing circuitry performs load pulsation compensation control to reduce vibration of the motor and power pulsation compensation control to reduce the charging and discharging current of the capacitor while performing constant current load control to control a rotational speed of the motor, and generates a q-axis current margin that is the difference between a q-axis current limit value and a q-axis current command, and uses the q-axis current margin to generate a torque current command for the load pulsation compensation control such that a torque current command allocatable to the power pulsation compensation control remains.

2. The power converter according to claim 1, comprising a vibration sensor detecting vibration of an apparatus in which the motor is installed, wherein the processing circuitry adjusts the torque current command for the load pulsation compensation control such that a detected value of the vibration sensor becomes less than or equal to a threshold.

3. A motor drive device comprising the power converter according to claim 2.

4. A refrigeration cycle application apparatus comprising the power converter according to claim 2.

5. A motor drive device comprising the power converter according to claim 1.

6. A refrigeration cycle application apparatus comprising the power converter according to claim 1.

7. The power converter according to claim 1, wherein the processing circuitry subtracts the q-axis current command from the q-axis current limit value to compute the q-axis current margin prior to generating either the load pulsation compensation control or the power pulsation compensation control.

8. The power converter according to claim 1, wherein the processing circuitry constrains the torque current command for the load pulsation compensation control and the torque current command for the power pulsation compensation control such that a sum thereof does not exceed the q-axis current limit value.

9. The power converter according to claim 1, wherein the power pulsation compensation control directly adjusts a torque-producing q-axis current component to reduce a magnitude of capacitor charging and discharging current.

10. A power converter, comprising:

a rectifier rectifying first AC power supplied from a commercial power source;

a capacitor connected to an output end of the rectifier;

an inverter connected across the capacitor, the inverter generating second AC power and outputting the second AC power to a motor; and processing circuitry controlling operation of the inverter such that pulsation according to a power state of the capacitor is superimposed on a drive pattern of the motor, to reduce a charging and discharging current of the capacitor, the power state of the capacitor including at least one of a rectified current flowing from the rectifier, an inverter input current flowing into the inverter, a capacitor current that is the charging and discharging current of the capacitor, and a capacitor voltage that is a voltage of the capacitor, wherein the processing circuitry performs load pulsation compensation control to reduce vibration of the motor and power pulsation compensation control to reduce the charging and discharging current of the capacitor while performing constant current load control to control a rotational speed of the motor, and generates a q-axis current margin that is the difference between a q-axis current limit value and a q-axis current command, and uses the q-axis current margin to generate a torque current command for the power pulsation compensation control such that a torque current command allocatable to the load pulsation compensation control remains.

11. The power converter according to claim 10, comprising a voltage detector detecting the capacitor voltage, wherein the processing circuitry determines by calculation the capacitor current, based on a detected value of the capacitor voltage and a capacitance of the capacitor, and adjusts the torque current command for the power pulsation compensation control such that a calculated value of the capacitor current becomes less than or equal to a threshold.

12. A motor drive device comprising the power converter according to claim 11.

13. A refrigeration cycle application apparatus comprising the power converter according to claim 11.

14. The power converter according to claim 10, comprising a current detector detecting the capacitor current, wherein the processing circuitry adjusts the torque current command for the power pulsation compensation control such that a detected value of the capacitor current becomes less than or equal to a threshold.

15. A motor drive device comprising the power converter according to claim 14.

16. A refrigeration cycle application apparatus comprising the power converter according to claim 14.

17. A motor drive device comprising the power converter according to claim 10.

18. A refrigeration cycle application apparatus comprising the power converter according to claim 10.

* * * * *